US011275596B2

(12) United States Patent
Cao et al.

(10) Patent No.: US 11,275,596 B2
(45) Date of Patent: Mar. 15, 2022

(54) SYSTEM AND METHOD FOR OPTIMIZING A USER INTERFACE AND A SYSTEM AND METHOD FOR MANIPULATING A USER'S INTERACTION WITH AN INTERFACE

(71) Applicant: City University of Hong Kong, Kowloon (HK)

(72) Inventors: Ying Cao, Shatin (HK); Xufang Pang, Shenzhen (CN); Antoni Bert Chan, Kowloon (HK); Rynson Wing Hung Lau, Kowloon (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 15/776,568

(22) PCT Filed: Jan. 15, 2016

(86) PCT No.: PCT/CN2016/071055
§ 371 (c)(1),
(2) Date: May 16, 2018

(87) PCT Pub. No.: WO2017/120895
PCT Pub. Date: Jul. 20, 2017

(65) Prior Publication Data
US 2018/0329727 A1    Nov. 15, 2018

(51) Int. Cl.
*G06F 3/0481*    (2022.01)
*G06F 9/451*    (2018.01)
*G06F 16/00*    (2019.01)
*G06F 16/957*    (2019.01)
*G06N 7/00*    (2006.01)

(52) U.S. Cl.
CPC ............ *G06F 9/451* (2018.02); *G06F 3/0481* (2013.01); *G06F 16/00* (2019.01); *G06F 16/9577* (2019.01); *G06N 7/005* (2013.01)

(58) Field of Classification Search
CPC ........ G06F 3/048; G06F 16/00; G06F 3/0481; G06T 9/00; G06N 7/005
See application file for complete search history.

(56) References Cited

U.S. PATENT DOCUMENTS 7,783,642 B1 *  8/2010  Feng ................... G06F 16/954
                                                      707/739
8,856,670 B1 * 10/2014  Thakur .................. G06F 9/451
                                                      715/765
9,424,671 B1 *  8/2016  DiVerdi ............... G06T 11/206
(Continued)

FOREIGN PATENT DOCUMENTS

CN      102112943      6/2011
CN      103970568      8/2014

*Primary Examiner* — Rashawn N Tillery
(74) *Attorney, Agent, or Firm* — Renner Kenner Greive Bobak Taylor & Weber

(57) ABSTRACT

A method for optimizing a user interface comprising the steps of segmenting the user interface into one or more interface components each having one or more component characteristics; applying a user behaviour model to the one or more component characteristics of each of the one or more interface components to determine one or more user interaction paths of the one or more interface components; and processing the one or more user interaction paths to optimize the one or more interface components of the user interface.

24 Claims, 13 Drawing Sheets

(56) References Cited

U.S. PATENT DOCUMENTS

| | | | |
|---|---|---|---|
| 10,027,888 B1* | 7/2018 | Mackraz | H04N 5/23238 |
| 2005/0261862 A1 | 11/2005 | Temasky et al. | |
| 2008/0120308 A1* | 5/2008 | Martinez | G06F 16/437 |
| 2009/0276729 A1* | 11/2009 | Cantu-Paz | G06F 16/954 |
| | | | 715/811 |
| 2011/0060717 A1* | 3/2011 | Forman | G06F 16/9535 |
| | | | 706/54 |
| 2012/0140255 A1* | 6/2012 | Tanaka | G06F 9/445 |
| | | | 358/1.13 |
| 2013/0152017 A1* | 6/2013 | Song | G06F 3/0482 |
| | | | 715/811 |
| 2013/0227426 A1 | 8/2013 | Mohapatra | |
| 2013/0246383 A1* | 9/2013 | White | G06F 16/9535 |
| | | | 707/706 |
| 2014/0282489 A1* | 9/2014 | Andrabi | G06Q 10/06 |
| | | | 717/174 |
| 2015/0113457 A1* | 4/2015 | Li | G06F 3/0488 |
| | | | 715/765 |
| 2017/0116104 A1* | 4/2017 | Abou Mahmoud | G06F 11/34 |
| 2019/0065159 A1* | 2/2019 | Varadarajan | G06F 8/34 |
| 2019/0199810 A1* | 6/2019 | Karon | G06F 17/10 |

* cited by examiner

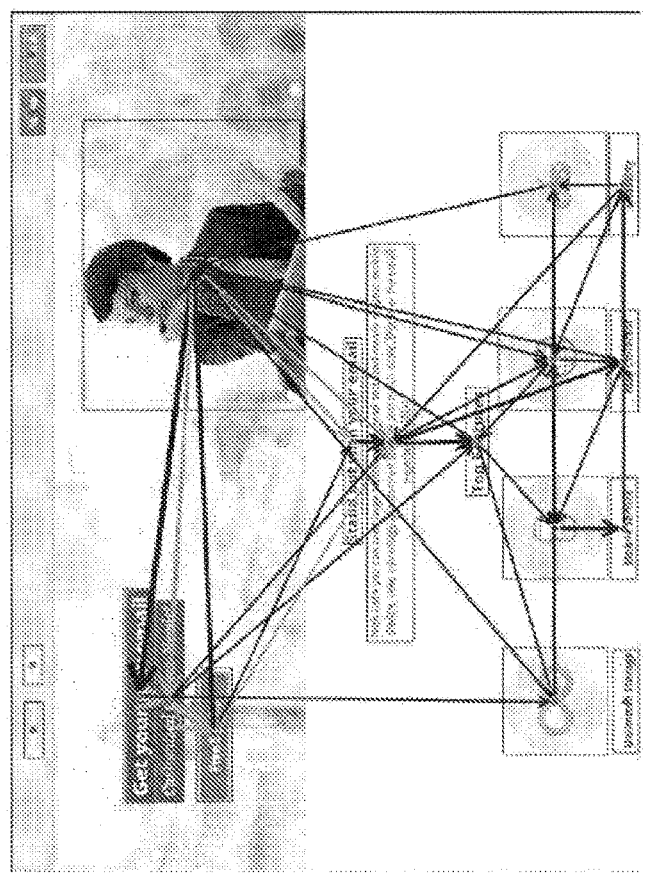
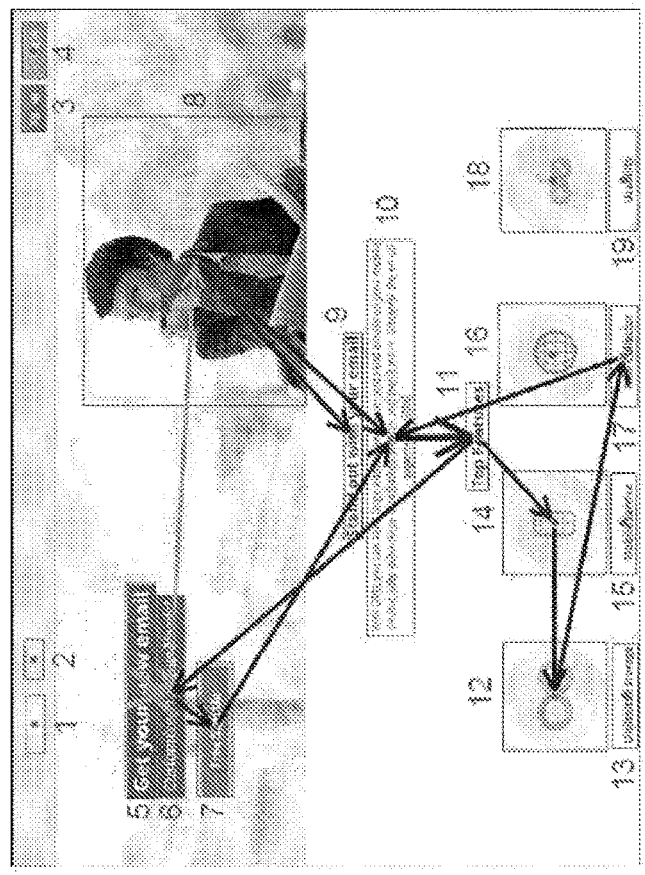
Fig. 5

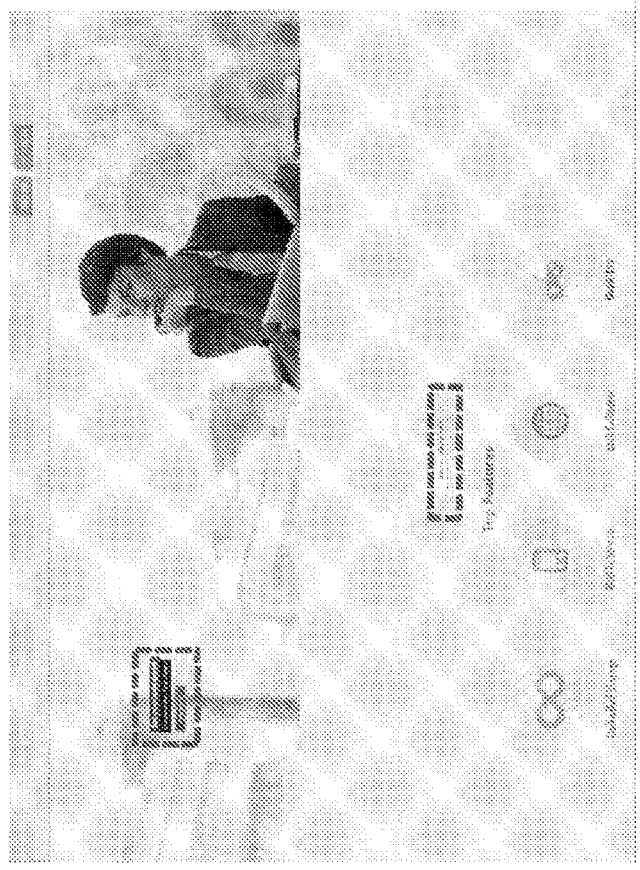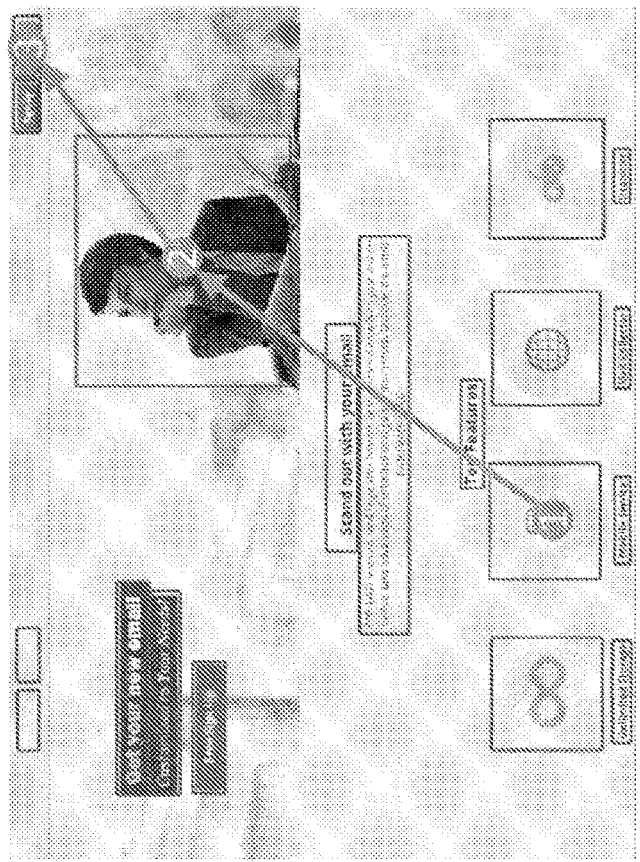
Fig. 12

SYSTEM AND METHOD FOR OPTIMIZING A USER INTERFACE AND A SYSTEM AND METHOD FOR MANIPULATING A USER'S INTERACTION WITH AN INTERFACE

TECHNICAL FIELD

The present invention relates to a system and method for optimizing a user interface and a system and method for manipulating a user's interaction with an interface, and particularly, although not exclusively, to a system and method for optimizing a computer user interface such as a webpage.

BACKGROUND

With the advancement in processing power and miniaturization of electronic and mechanical components, many devices are now supporting a greater level of complexity and functionality. In turn, this has allowed more options for interaction between a user and the device itself.

Whilst the offering of more functional features in these devices has been beneficial, the interface of the device may potentially be a hurdle for many device designers or manufacturers. A complex interface that does not allow for ease of interaction with the user can cause problems ranging from minor inconveniences to major errors which can cause economic loss or disasters. Accordingly, an analysis of the way in which a user may interact with an interface could improve the design of an interface to improve the user's interaction.

Designs of interface may also extend to Computer Graphical Interfaces (CGI) where a computing desktop, tablet home page or webpage, can be improved so as to enhance its usability. In turn, an improvement of CGIs would attract a larger user base as ease of use and efficiencies in issuing commands to the computer is greatly valued by the end user.

SUMMARY OF THE INVENTION

In accordance with a first aspect of the present invention, there is provided a method for optimizing a user interface comprising the steps of:
  segmenting the user interface into one or more interface components each having one or more component characteristics;
  applying a user behaviour model to the one or more component characteristics of each of the one or more interface components to determine one or more user interaction paths of the one or more interface components; and
  processing the one or more user interaction paths to optimize the one or more interface components of the user interface.

In an embodiment of the first aspect, the step of processing the one or more user interaction paths to optimize the one or more interface components of the user interface includes a step of determining one or more optimized interaction path of the user interface.

In an embodiment of the first aspect, the one or more optimized interaction paths of the user interface is determined by adjusting the one or more component characteristics and applying the user behaviour model to the adjusted one or more component characteristics.

In an embodiment of the first aspect, the step of adjusting the one or more component characteristics generates a set of optimal component characteristics associated with the one or more optimized interaction paths.

In an embodiment of the first aspect, the user behaviour model is arranged to model the user's spatial interaction with the one or more interface components.

In an embodiment of the first aspect, the user behaviour model is further arranged to model the user's temporal interaction with the one or more interface components.

In an embodiment of the first aspect, the user behaviour model includes a user attention transition model arranged to predict the user's attention transition between any plurality of the interface components.

In an embodiment of the first aspect, the user behaviour model further includes a user attention order model arranged to predict the user's attention order between any plurality of the interface components.

In an embodiment of the first aspect, the user attention transition model includes one or more correlations between the user's attention transition between the plurality of the interface components and the one or more component characteristics of the plurality of interface components.

In an embodiment of the first aspect, the user attention order model includes one or more correlations between the user's attention order between the plurality of the interface components and the one or more component characteristics of the plurality of interface components.

In an embodiment of the first aspect, the one or more interface components includes user interactive objects, display objects, text, graphics or any combination of one or more thereof.

In an embodiment of the first aspect, the one or more component characteristics of the one or more interface components includes pairwise characteristics of any two interface components.

In an embodiment of the first aspect, the pairwise characteristics includes: scale ratio, normalized distance, normalized position, relative orientation, intensity difference, colour contrast or any one or more thereof between the any two interface components.

In an embodiment of the first aspect, the one or more component characteristics of the one or more interface components include context characteristics of any interface components relative to its adjacent interface components.

In an embodiment of the first aspect, the context characteristics includes: normalized distance to the nearest neighbour, relative orientation to the nearest neighbour, size ratio to the largest neighbour, brightness ratio to the brightest neighbour or any one or more thereof between the any interface component and its adjacent interface components.

In accordance with a second aspect of the present invention, there is provided a method for manipulating a user's interaction with an interface comprising the steps of:
  analysing the interface with a user behaviour model to determine one or more user interaction paths;
  modifying the interface by adjusting one or more interface components of the interface based on the one or more user interaction paths.

In an embodiment of the second aspect, the user behaviour model is arranged to model the user's interaction with the interface based on a relationship between the user's interaction and one or more characteristics of the one or more interface components.

In an embodiment of the second aspect, the user behaviour model is further arranged to model the user's spatial interaction with the interface.

In an embodiment of the second aspect, the user behaviour model is further arranged to model the user's temporal interaction with the interface.

In an embodiment of the second aspect, the one or more interface components of the interface is adjusted to match those of a set of optimal characteristics associated with the one or more interface components, the set of optimal characteristics being generated by one or more preferred user interaction paths.

In accordance with a third aspect of the present invention, there is provided a system for optimizing a user interface comprising:
- a segmenting module arranged to segment the user interface into one or more interface components each having one or more component characteristics;
- an interaction modelling engine arranged to applying a user behaviour model to the one or more component characteristics of each of the one or more interface components to determine one or more user interaction paths of the one or more interface components; and
- an optimization processor arranged to process the one or more user interaction paths to optimize the one or more interface components of the user interface.

In an embodiment of the third aspect, the optimization processor determines one or more optimized interaction paths of the user interface.

In an embodiment of the third aspect, the one or more optimized interaction paths of the user interface is determined by adjusting the one or more component characteristics and applying the user behavior model to the adjusted one or more component characteristics.

In an embodiment of the third aspect, the optimization processor generates a set of optimal component characteristics associated with the one or more optimized interaction paths.

In an embodiment of the third aspect, the user behaviour model is arranged to model the user's spatial interaction with the one or more interface components.

In an embodiment of the third aspect, the user behaviour model is further arranged to model the user's temporal interaction with the one or more interface components.

In an embodiment of the third aspect, the user behaviour model includes a user attention transition model arranged to predict the user's attention transition between any plurality of the interface components.

In an embodiment of the third aspect, the user behaviour model further includes a user attention order model arranged to predict the user's attention order between any plurality of the interface components.

In an embodiment of the third aspect, the user attention transition model includes one or more correlations between the user's attention transition between the plurality of the interface components and the one or more component characteristics of the plurality of interface components.

In an embodiment of the third aspect, the user attention order model includes one or more correlations between the user's attention order between the plurality of the interface components and the one or more component characteristics of the plurality of interface components.

In an embodiment of the third aspect, the one or more interface components includes user interactive objects, display objects, text, graphics or any combination of one or more thereof.

In an embodiment of the third aspect, the one or more component characteristics of the one or more interface components includes pairwise characteristics of any two interface components.

In an embodiment of the third aspect, the pairwise characteristics includes: scale ratio, normalized distance, normalized position, relative orientation, intensity difference, colour contrast or any one or more thereof between the any two interface components.

In an embodiment of the third aspect, the one or more component characteristics of the one or more interface components includes context characteristics of any interface components relative to its adjacent interface components.

In an embodiment of the third aspect, the context characteristics includes: normalized distance to the nearest neighbour, relative orientation to the nearest neighbour, size ratio to the largest neighbour, brightness ratio to the brightest neighbour or any one or more thereof between the any interface component and its adjacent interface components.

In accordance with a fourth aspect of the present invention, there is provided a system for manipulating a user's interaction with an interface comprising:
- an interaction modelling engine arranged to analysis the interface with a user behaviour model to determine one or more user interaction paths;
- an optimization processor arranged to modify the interface by adjusting one or more interface components of the interface based on the one or more user interaction paths.

In an embodiment of the fourth aspect, the user behaviour model is arranged to model the user's interaction with the interface based on a relationship between the user's interaction and one or more characteristics of the one or more interface components.

BRIEF DESCRIPTION OF THE DRAWINGS

Embodiments of the present invention will now be described, by way of example, with reference to the accompanying drawings in which:

FIG. 5 shows attention transition graphs for task-driven mode and free-viewing mode;

FIG. 12 are illustrations of another embodiment of the system for optimizing an interface having a more extreme input path.

DETAILED DESCRIPTION OF THE PREFERRED EMBODIMENT

Figure 1:
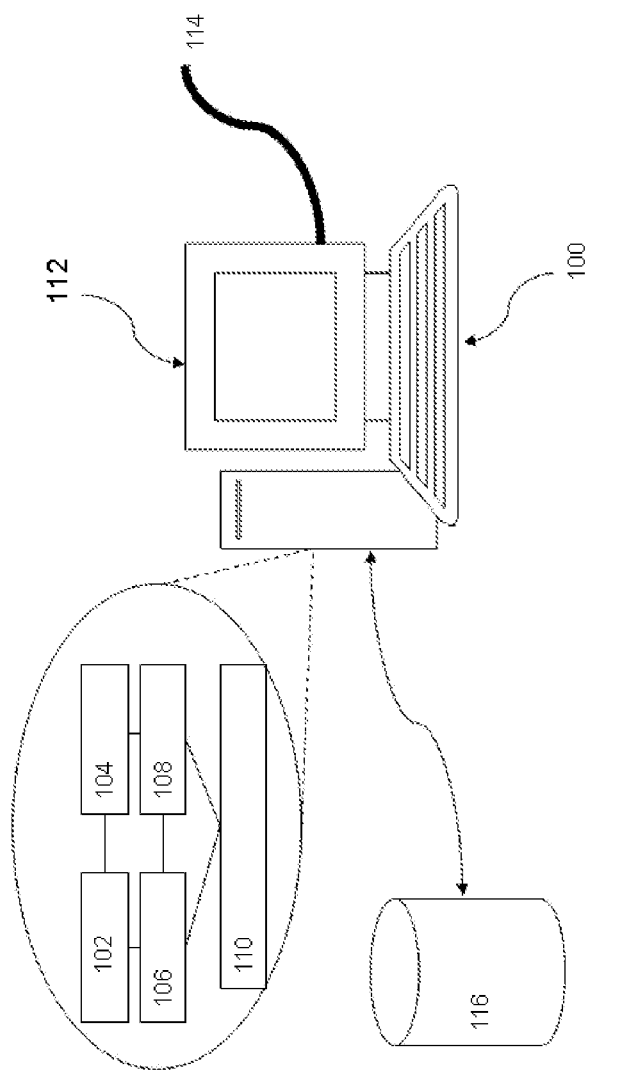
FIG. 1 is a schematic block diagram of a computing device arranged to operate as a system for optimizing an interface in accordance with one embodiment of the present invention.

Without wishing to be bound by theory, the inventors have, through their own trials, research and experimentation devised that user interfaces, particularly, computer graphical interfaces such as webpages may be used in various fashions (e.g., personal, commercial and government webpages) to provide different functions. The significant impact of webpages on everyday life and business has motivated efforts by web designers or interface designers to study how it is possible to design a usable and engaging webpage that in turn results in many formalized guidelines that web designers can rely on.

While these guidelines can be easily operated by designers to evaluate and improve a web design, they are mostly focused on visual aspects of the design. Webpages may sometimes be considered as a task-oriented medium, created with some purposes in mind, e.g., more sales, more clicks, etc. Therefore, besides visual aesthetics, functional aspects of a web design, i.e., how well it communicates information in a way intended by designers, is also an important consideration during the design phase. In order to communicate ideas quickly and clearly, it is desirable for web designers to understand how different design configurations change user behaviors and be able to direct users' behaviors via effective designs.

Unfortunately, while a skilled designer can wield some rules of thumb, such as alignment, symmetry and color compatibility, to achieve visually appealing design, evaluating and controlling the functionality of a web design is non-trivial for designers, since it requires understanding user behaviors in response to complex variations of a design. To analyze user behaviors on webpages, one example methodology may be to collect and analyze eye gaze data from users on webpages. The navigation patterns of users on the webpages reveal useful information as to how users are informed and impacted by the design. However, little work has been done to quantify the relation between web design characteristics and user attention patterns.

In one example of the present invention, a data-driven approach to quantitatively model a users' viewing behaviors on web designs was performed by gathering and analyzing eye tracking data of different users on various web designs under task-driven condition. In one example, observations that were made included that web designs may be considered to be a visual medium comprising a group of discrete, but semantically relevant elements (e.g., text, pictures, buttons) that are arranged in two dimensional (2D) domain.

In turn, when a user is browsing a webpage, users may mentally assemble the elements as a whole to interpret the meaning behind it. Thus, how users are informed during exploration of the webpage heavily depends on not only where the user looks but also when the user looks at specific regions. As an example, when browsing a commercial website, users may have higher chance of performing a purchasing action if they see a "SALE" sign before seeing their favourite product. Thus, this temporal aspect of user attention may be important for consideration, i.e., the transition of attention between page components, and the order that page components are visited.

In one example, after acquiring eye movement data from different users on a collection of webpages, statistical analysis was first performed to study the characteristics of users' eye movements when browsing webpages. Then, sufficient data may be provided so as to build two predictive models that describe the temporal behaviours of user attention between page components. This is advantageous to methods where the modelling of visual saliency on webpages is in the spatial domain as embodiments of the present invention may also model a user's attention as it moves across web contents both spatially and temporally.

In turn, once a user attention model is developed, the user model may then be used by an example embodiment of the present invention to model, analysis or predict a web design interaction that permits designers to control user attention behaviours intuitively. In one example, the model when arranged to perform these functions allows a designer to start from an initial web design, the designer then sketches a trajectory across a subset of page components to indicate the reading path that they expect users to follow. Then, the web design is optimized automatically so that actual user behaviours on it are as consistent with the designer's intent as possible. By driving users' eyes to move along a planned path, the chances that the users will do what the designer want them to do will increase.

Typically, web designers can only draw users' attention to a particular portion of a page by, for example, using large objects or contrasting colours. In contrast, examples of the present invention may enable, for the first time, designers to manipulate how users move their eyes across multiple regions, thereby controlling how information is conveyed to them. The optimized web design is obtained by adjusting the attributes of the page components to minimize an objective function comprising three terms: attention term, prior term, and regularization term. The attention term is based on our user attention models, and encourages users' actual attention behaviours to match with designers' expectations. The regularization and prior terms guarantee the validity of the final web design by imposing a set of visual design principles while keeping it close to the original design.

One example embodiment of the present invention was also applied to a variety of web designs with results of these varieties of web designs recorded. In addition, a user study to validate the effectiveness of this embodiment of the invention was also performed in directing user attention according to the designer's high-level intent. In turn, examples of the invention were able to introduce subtle variations to an input web design to effectively guide user attention behaviours, while still preserving the original layout style of the input page as much as possible.

Embodiments of the present invention may be advantageous in that:

Examples of the system are arranged to provide a web design interaction that enables web designers to intuitively control user attention movement on their web designs;

Examples of the system are arranged to provide a collection and analysis of users' eye movement data on webpages of various categories under both task-oriented and free-viewing conditions, which provides evidence-based understanding of the characteristics of user attention on web designs and motivates the design of effective visual attention models for web designs;

Examples of the system are arranged to operate with user attention models that are acquired by learning from actual eye gaze data to predict the temporal behaviors of user attention between two page components on a web design; and The system may be arranged to provide an optimization framework that is arranged to automatically adjust an existing web design to match the designer's intent in directing user attention.

With reference to FIG. 1, there is illustrated a schematic diagram of a computing device arranged to be implemented or programmed to operate as a system for optimizing a user interface comprising: a segmenting module arranged to segment the user interface into one or more interface components each having one or more component characteristics; an interaction modelling engine arranged to applying a user behaviour model to the one or more component characteristics of each of the one or more interface components to determine one or more user interaction paths of the one or more interface components; and an optimization processor arranged to process the one or more user interaction paths to optimize the one or more interface components of the user interface. As a person skilled in the art would appreciate, the term "interaction" would include any form of interaction or access, including the manipulation of a control surface or actuator as well as access in the form of study, reading, looking or a simple eye gaze.

In this embodiment, the computing device may be a computer or a computer server 100 which may 100 comprise suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The service may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

Figure 2:
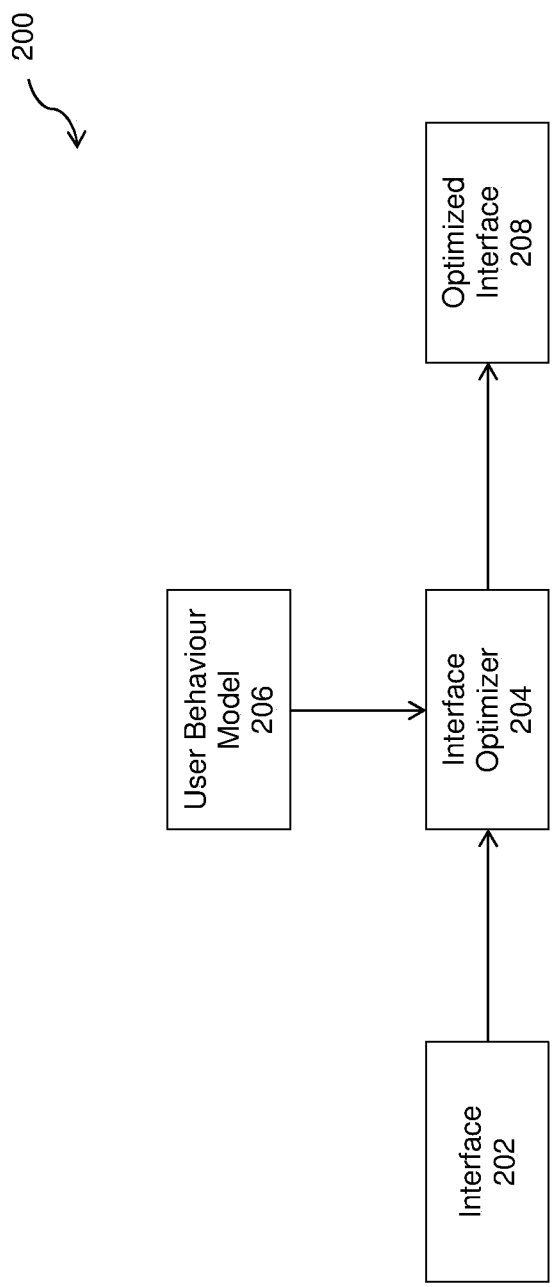
FIG. 2 is a block diagram of an embodiment of a system for optimizing an interface as implemented on a computing device of FIG. 1.

With reference to FIG. 2, there is illustrated a block diagram of an embodiment of a system for optimizing a user interface 200 which may be implemented to operate on or with a computing apparatus or server 100 as illustrated in FIG. 1. In this embodiment, the system 200 includes an optimization processor 204 which when it is inputted with data associated with an interface 202 desired to be optimized, will use a user behaviour model 206 to optimize the components of the interface so as to generate an optimized interface 208.

Figure 3A:
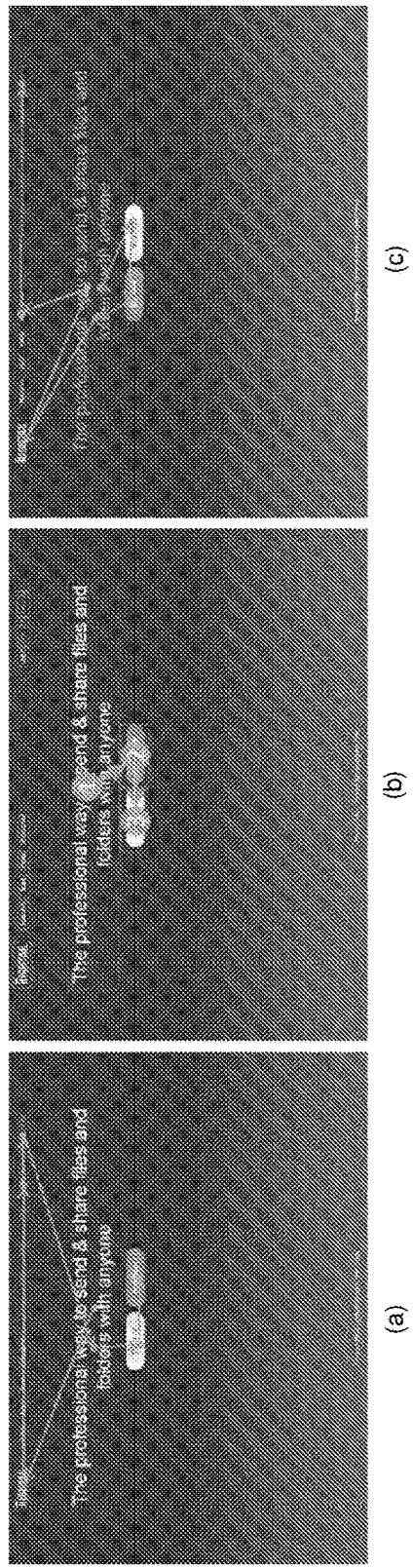
FIG. 3A is an example screenshot of an interface undergoing an optimization process by the system for optimizing an interface of FIG. 2.

Preferably, the system for optimizing a user interface 200 may be used or otherwise arranged to optimize a computer user interface 202 such as a graphical user interface found on websites, software, applications, operating systems on computing devices, smart phones, tablet computers or the like. In one example embodiment as shown in FIG. 3A, the system may be provided with an input interface, such as a web design (a) and a designer-specified path over a subset of page components trajectory 1, 2, 3 in (b)), our method automatically generates a novel web design (c) from the input design by modifying the properties of the components (e.g., position, size and color), so that the actual attention paths of users will match with the input path (i.e., the eyes of users when browsing the resulting design should move across the subset of components successively along the input path). This results in a novel web design interaction which allows designers to intuitively control attention patterns of users on their web designs. The eye gaze paths of a test user on the input and novel designs are visualized in (a) and (c) using trajectory liner.

Figure 3B:
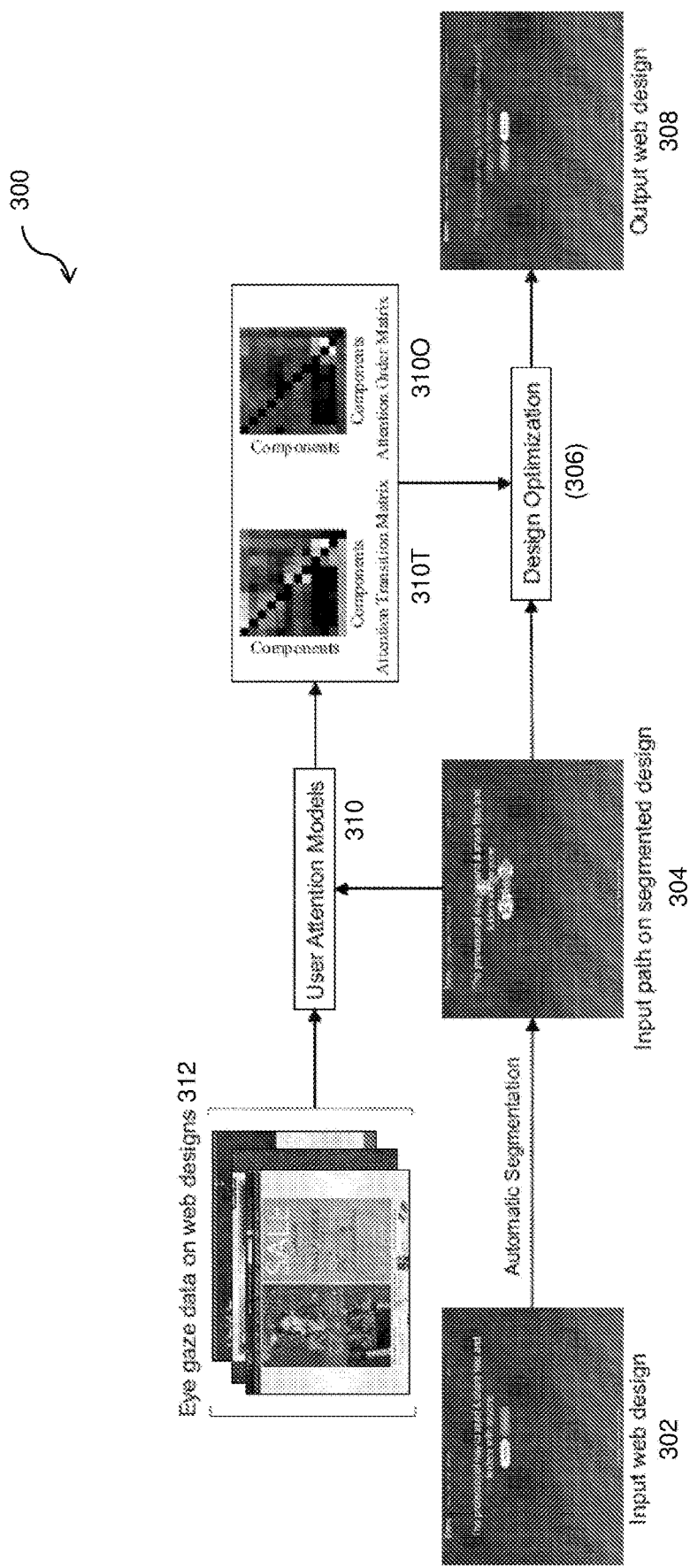
FIG. 3B is a block diagram illustrating the process flow of an interface undergoing an optimization process by the system for optimizing an interface of FIG. 2.

As shown in FIG. 3B, this embodiment of the system for optimizing an interface 300 may, upon receiving an input web design 302 or any other computing interface, segment the design into a set of page components 304, and extract the attributes of all the components from its HTML source file, along with a visual hierarchy tree using its DOM tree. Since there may exist regions that draw attention but are difficult to segment automatically, e.g., faces in a background image, designers may also be allowed to manually segment some regions and set them as page components. Next, a designer may then draw a path across a subset of components, indicating the intended reading path (1, 2, 3) of the components. Finally, the input design is automatically refined subject to the designer's intentions (306).

With reference to FIG. 3B, there is illustrated a work flow diagram which shows the process flow of an embodiment of a system for optimizing a user interface 300. Preferably, in order to provide these functionalities as described above, the system 300, in this example, is provided with a pair of user attention models 310 that describe the temporal behaviors of user attention between a pair of page components may be used. To understand and model user behaviors when viewing web designs, eye-tracking data of different users on a web design corpus consisting of different genres (e.g., shopping, game, social media, etc.) under different viewing conditions (i.e., task-oriented and free-viewing conditions) 312 is collected and analyzed. Based on the collected data, it is possible to build an attention transition model 310T, which can predict the likelihood of user attention moving from one page component to another, and an attention order model 310O, which can predict the likelihood of one page component being visited before another. The two user attention models 310T, 310O are then used in an optimization framework (306) to generate the refined web design 308.

This embodiment may be advantageous in that the method in which a computer interface is optimized includes the optimization of geometric and visual properties of the components on a web design for a specific purpose. In this respect, it bears some similarity to works which address layout and composition problems in various domains, such as furniture layout, floor plans, and graphic design layout. However, these techniques are especially designed for their respective problem domains, and thus cannot be easily adopted to address the problem of understanding and modelling of user attention behaviours on web designs.

Recent progress in data-driven web design has demonstrated how a large-scale corpus of webpages can be exploited to help web designers. There has been developed a scalable infrastructure for acquiring and managing a large repository of webpages crawled from the web. Such repository enables several unique design mechanisms, such as example-based webpage retargeting that allows any webpage to be used as a design template, design based search that allows designers to easily find relevant examples for inspiration, and probabilistic grammar induction for synthesizing novel designs from high-level specification. However, these works mainly focus on aiding the visual aspect of the web design process. In contrast, examples of the system for optimizing a user interface 200, 300 focus on improving the functional aspect of webpages, by providing the web designer with the unique ability to intuitively control user attention behaviours on them.

Furthermore, understanding where users look and how their visual attention moves on webpages are helpful for web designers to create more effective designs. According to analysis of observations, reading patterns that users tend to adopt when navigating through webpages include, for example, Z-pattern and F-pattern. In practice, such patterns have been formalized as rules that web designers mainly rely upon to encourage users to look through important regions. However, since user attention behaviours are typically influenced by complex factors and vary considerably under different contexts, these simple rules can only provide limited knowledge of how user attention changes with different page configurations. To tackle this issue, the implementation of an example embodiment of the system for optimizing an interface may be aimed to quantify the correlation between web design configuration and user attention patterns. Given this goal, other systems which use machine learning techniques to predict a saliency map (encoding where a user looks) from the snapshot of a given webpage may also provide assistance to web designers as the saliency map that is created can then be used by designers to improve their design iteratively. However, the major advantage and distinction between these works and aspects of the present invention is that, amongst other things, rather than predicting the perceptual importance of each location on a webpage, the system is able to focus its prediction on temporal attention patterns between page components (i.e., how the gaze moves from one component to another) to facilitate a unique design interaction. Furthermore, the system 200, 300 may also be advantageous in that it is capable of automating the design refinement process, requiring only high-level input from web designers.

Figure 4:
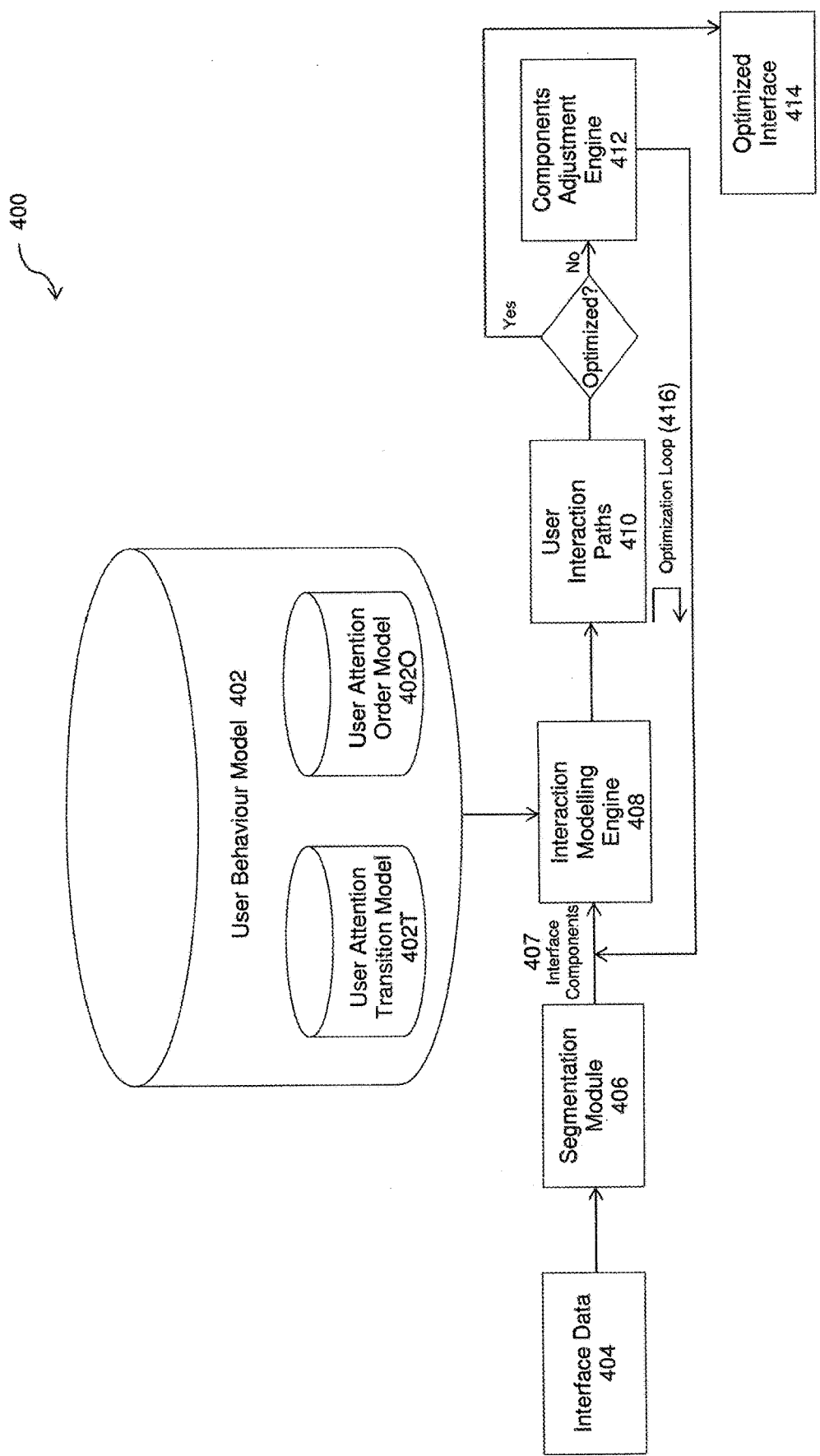
FIG. 4 is a block diagram of an example embodiment of a system for optimizing an interface.

With reference to FIG. 4, there is illustrated a data flow block diagram of a system for optimizing a user interface 400 comprising: a segmenting module 406 arranged to segment the user interface 404 into one or more interface components 407 each having one or more component characteristics; an interaction modelling engine 408 arranged to applying a user behaviour model 402 to the one or more component characteristics of each of the one or more interface components 407 to determine one or more user interaction paths 410 of the one or more interface components; and an optimization processor (416) arranged to process the one or more user interaction paths to optimize the one or more interface components of the user interface 404.

In this embodiment, the system for optimizing a user interface 400 may be implemented on a computing device or any suitable computing apparatus, including a computer server connected to a communication network, a cloud based server, a Personal Computer, a tablet computer or any processing device. The system 400, once suitably implemented, may operate as a method for optimizing a user interface comprising the steps of: segmenting the user interface into one or more interface components each having one or more component characteristics; applying a user behaviour model to the one or more component characteristics of each of the one or more interface components to determine one or more user interaction paths of the one or more interface components; and processing the one or more user interaction paths to optimize the one or more interface components of the user interface.

In this embodiment, the system 400 firstly receives an interface 404, such as a computer graphical interface from a user that is required to be process, analysed or optimized. This interface 404 may be a website or any other suitable interface and may be presented in a suitable data format. Preferably, in examples where the interface is a webpage, the data that is presented as the interface 404 may include a plurality of components 407 each representative of a portion or object of the interface 404. These portions or objects of the interface 407 may include manipulable buttons, graphics, animations, content boxes, output panels, frames, columns, links, navigation tabs, banners, headers, footers, search boxes, shopping cards, shopping baskets, contact information headers, or any similar interface components 407 and may be presented within the HTML code that is inputted as data to the system for processing and optimization 400.

Once the data relating to an interface 404 is provided to the system, the system 400 firstly segments the data into multiple interface components by use of a segmentation module 406. In examples where the data is a webpage code, the segmentation module 406 may be a computer code parser that would segment the code into individual objects that may have been coded within the webpage. These individual objects may then be provided in a list or structured format together with a reference to each of the components 407 and its associated characteristics. These characteristics may include, for example, the location of the component 407 on the interface (e.g., an X,Y coordinate), the colour of the component, the type of component it is and what type of interaction it would attract from a user (e.g., read, pressed, scrolled etc), size, animated or not animated, contrasted or not contrasted, brightness, intensity, shape, or any combination of one or more thereof.

Once the segmentation module 406 has completed the segmentation of the interface into individual interface components 407 each with its own associated component characteristics, the list or collection of interface components 407 is then processed by a interaction modelling engine 408 arranged to simulate or otherwise model a user's behaviour or interaction with the interface 404. In order to model the user's behaviour or interaction with the interface, the engine 408 uses a pre-generated user behaviour model 402 to determine, based on the characteristics of each of the interface components 407, one or more likely interaction paths 410 or patterns of a user when using the interface.

To illustrate an example in which an embodiment of the present invention will operate, as a user would interact with an interface 404, such as a webpage, the user may be directed to the banner or title components of the webpage in the first instance, followed by the next component which catches the user's attention. This may be, for example, a content box adjacent to the title or banner of the webpage, or a flashing button that is boldly printed near the central portions of the page. In turn, the user may then interact with this next component and be directed to the next eye catching component.

This example would thus illustrate that a user would generate a path or pattern as to their interaction of the particular web interface. What could be observed is that specific characteristics of each of the components may in turn be more eye catching to the user than others and thus forms a hypothetical path. Although each path may include a probability, it follows that there would be a correlation between each characteristic of each component and the probability of it being the next eye catching component for a user. It also follows that the relationship of one component, relative to another component on the interface, may also affect the probability of it being the next eye catching component.

In turn, the user behaviour model 402 may be pre-generated based on the recordal of real user behaviour in their usage of specific types of interfaces and drawing correlating relationships between their usage patterns and probabilities with that of the characteristics of the interface components 407 and the relationship of each component relative to another component on the same interface 404. Thus in term, the collection and processing of this recorded data will form a user behaviour model 402 which is further described below.

In this example embodiment, the user behaviour model 402 may include a user attention transition model 402T and a user attention order model 402O, each of which allows the user behaviour model to model the manner in which the user interacts with the interface so as to create a more accurate interaction path 410 or pattern. The user attention transition model 402T, which will be explained in further details below, is arranged to model the transition of a user's attention between any two interface components 407 and includes the consideration of the characteristics of each of the components as well as their pairwise characteristics, that is a comparison of their pairwise features, such as their relative positions or size to each other and/or their colour or intensity differences.

In turn, the user attention order model 402O may be arranged to model the order in which a user's attention would go from one component to the next, including the probability as to the order of the next component that will be interacted with by the user. In this way, a tree like structure may be generated to represent the path of the user's attention order and likewise, the characteristics of each of the component as well as their contextual feature of two components may be considered as part of the model in modelling of the attention order in which the user would interact with each components on the interface.

Once the interaction modelling engine 408 applies the user behaviour model 402 to interface components 407 of the interface, one or more user interaction paths 410 may be generated. These one or more user interaction paths 410, as described earlier, are a list of possible components of the interface which may be predicted to be interacted by a user in a particular order. As it will be appreciated, the user interaction path 410 may have multiple branches to form a tree or even network like graph as each branch may represent one predicted possible path of interaction by a user. Preferably, as the interaction modelling engine 408 may perform different types of modelling and together with the collected data stored in the pre-generated user behaviour model 402, it is expected that that for each possible path will be associated with a probability that the specific interaction path 410 is taken by any user.

In this example, the one or more interaction paths 410 can serve several purposes to the system for optimizing an interface 400. In one example, if a designer of the interface has a preferred interaction path in mind when designing the interface, the designer can enter their specific interface design into the system 400 and allow the interaction modelling engine 408 to generate one or more interaction paths 410. In turn, the designer can assess the performance of their design or the designer can also compare the generated one or more interaction paths 410 with their preferred design path and proceed to assess their own interface design. If the one or more interaction paths generated by the interaction modelling engine 408 is not to a desired standard, the designer can adjust their design accordingly.

As shown in FIG. 4, the optimization process (416) is to use the one or more user interaction paths 410 so as to optimize the interface by permitting adjustments to the interface components. Similar to a designer's approach as listed above, the optimization process (416) uses an adjustment engine 412 to adjust the interface components 407. These adjustments can be to the characteristics of each of the interface components 407 such as adjusting their colour, size, location, etc of each of the interface components 407. In turn, once the adjustments are made by the adjustment engine 412, the adjusted interface components are returned to the interaction modelling engine 408 with a new set of user interaction paths 410 to be generated. This new set of user interaction paths 410 can then be compared with the previous user interaction paths 410 generated from the last iteration of the optimization process, forming an optimization loop (416).

After a number of iteration of these optimization loops (416), or when a predetermined condition for optimization is satisfied, for example, that a desired interaction path has been tracked with minimal or an acceptable level of tracking error, the interface would be considered optimized and thus forming the optimized interface 414. The characteristics of each of the interface components 407 could then be recorded as a set of optimal characteristics. A more detailed description of this optimization process is described further below.

During the conception of the invention, the inventors have discovered that to understand the behaviours of users when browsing web designs, they had collected a corpus of webpages from 7 different categories, each of which has a single and specific purpose. The categories considered include social networking, gaming, job searching, email, shopping, product promotion and file sharing. For each category, the inventors had crawled 10 webpages from the web and stored their snapshots as web designs. Then, the inventors had used an eye tracker to record eye movements of human subjects under two different viewing modes: task-driven mode and free-viewing mode. In each viewing session under task-driven mode, each participant was asked to complete a sequence of tasks, each containing a task instruction relevant to the webpage category, followed by one or two web designs to view. For example, the participants were asked to compare two web designs of social networking and choose the one that they preferred to join. The presentation order of the tasks was randomized for each participant. In free-viewing mode, each participant was shown a sequence of web designs randomly selected from our dataset, and asked to view the pages casually without any constraint. For both modes, the inventors did not limit the time spent by the participants on viewing each page, allowing them to manually advance their own progress via mouse-click.

The inventors had also captured the eye gaze data of each participant as a temporal series of fixation points. Each fixation point contains 2D position $x=(x,y)$ along with its duration d. For each web design under each mode, the inventors had collected eye movement data from 10 participants. In a post-processing stage, the Bento algorithm was used to segment each page in the dataset into a visual hierarchy tree of components.

It follows that for each web design under each viewing mode, the inventors then constructed an attention transition graph which summarizes how users move their attention between page components. Two example attention transition graphs for task-driven and free-viewing modes on a web design are shown in FIG. 5 which shows Attention transition graphs for task-driven mode (left) and free-viewing mode (right) on a web design. Darker Shaded arrows represent single-direction and lighter arrows representing double-direction attention transitions. The arrow thickness is proportional to the fraction of users moving attention along the arrow.

As shown in FIG. 5, the nodes of the attention transition graph are the page components corresponding to the leaf nodes of the visual hierarchy tree. A directed edge is added from one component $c_i$ to another $c_j$, if there exist any user moving eyes from $c_i$ to $c_j$. We encode edge weights of the graph in an attention transition matrix T, where each entry T(i,j) denotes the percentage of users that move their eyes from $c_i$ to $c_j$.

Figure 6:
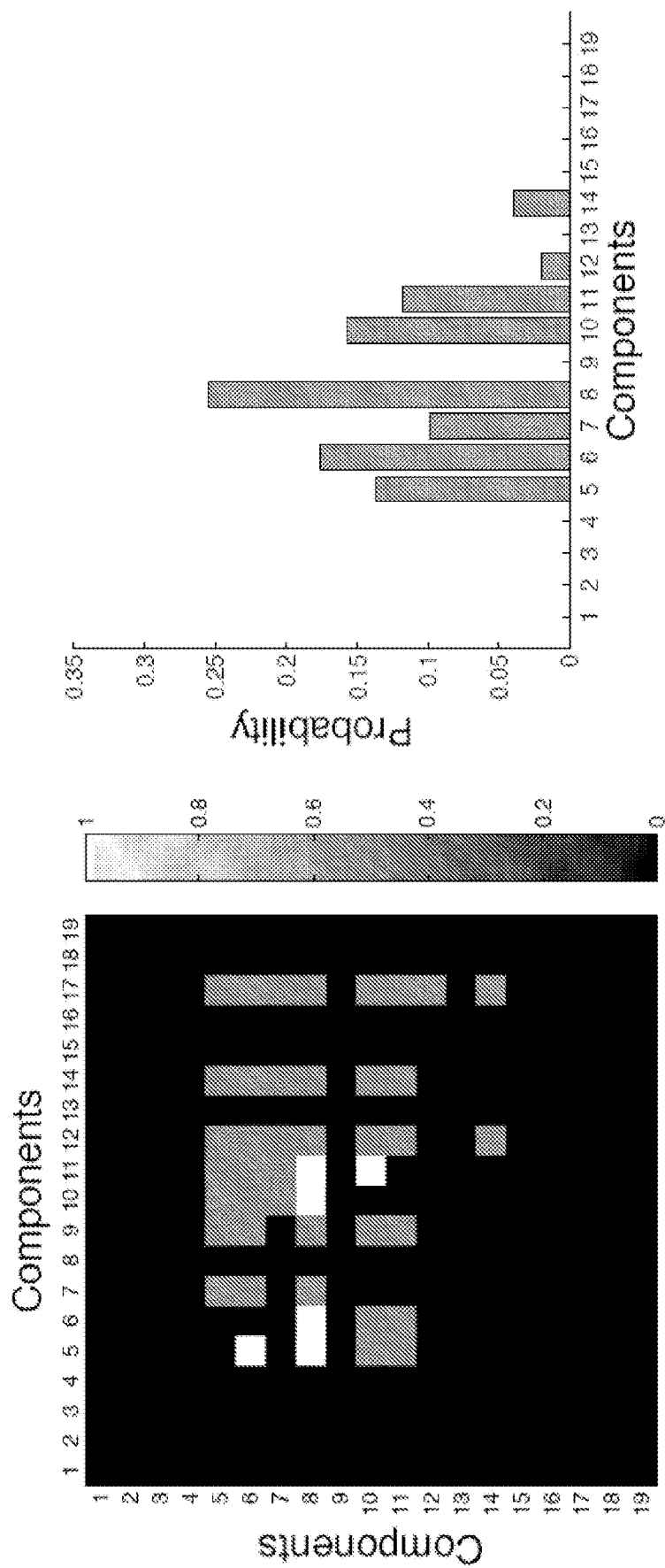
FIG. 6 shows a partial order matrix as computed for the web design of FIG. 5 and the probability graph of a page component that will be first visited.

In one example, to study the temporal order that users visit the page components, the inventors then built a partial order matrix O for each web design, where each entry O(i,j) represents the percentage of users that visited component i before component j. The probability that a page component is visited before any other component (i.e., first) is obtained from the partial order matrix by normalizing the matrix and summing along each row, $h(i)=\Sigma_k \hat{O}(i,k)$ where $\hat{O}$ is the normalized partial order matrix. The inventors then denote h as the order probability, which summarizes the information about the temporal order that users look at each component on the page. FIG. 6, which illustrates on the left a partial order matrix computed for the web design shown in FIG. 5, and on the right: the probability that a page component is visited first is obtained by summing along the corresponding row of the normalized partial order matrix, will thus show O and h computed using eye tracking data under the task-driven condition for a web design.

Using the collected data, statistical analysis was performed to understand user attention patterns on web designs under different contexts. In particular, a focus was placed in two main questions. First, is there any discrepancy in users' eye gaze behaviours between different contexts, i.e., task-driven and free-viewing conditions. Second, can saliency maps be directly used to well approximate attention transition patterns.

To verify if there exists discrepancies in user behaviours between different contexts, the inventors then perform a correlation analysis to investigate how well users' eye gaze data is correlated between task-driven and free-viewing conditions. In turn, users' eye gaze data was described by using three measures, including saliency map $M^1$, local attention transition $M^2$ and global eye gaze path $M^3$. $M^1$ is a spatial measure that indicates where users look, and is computed as an intensity map by convolving the users' fixation locations on a web design with a Gaussian kernel. A position in $M^1$ with a higher value is more visually important. $M^2$ is a temporal measure that indicates how users move their eyes between each pair of page components in a web design. The inventors had constructed an attention transition graph as described above from users' eye gaze data, and treat the edge weight matrix of the graph as $M^2$. $M^3$ is a spatial and temporal measure that indicates how users move their eyes across the whole web design. For each viewer, $M^3$ is calculated as a vector formed by concatenating eye fixation positions in temporal order. For each pair of users (k,j) on each web design in our dataset, the inventors calculate the Pearson's correlation coefficient between their corresponding eye gaze measures, i.e., $r_{k,j}^i=\text{corr}(M_k^i,M_j^i)$.

By aggregating across all the web designs in our dataset and across all the pairs of users from the same condition, two within-condition correlation coefficients are obtained, one for task-driven condition and another for free-viewing condition. Similarly, a across-condition coefficient is also calculated by aggregating across all pairs of users from different conditions.

Figure 7:
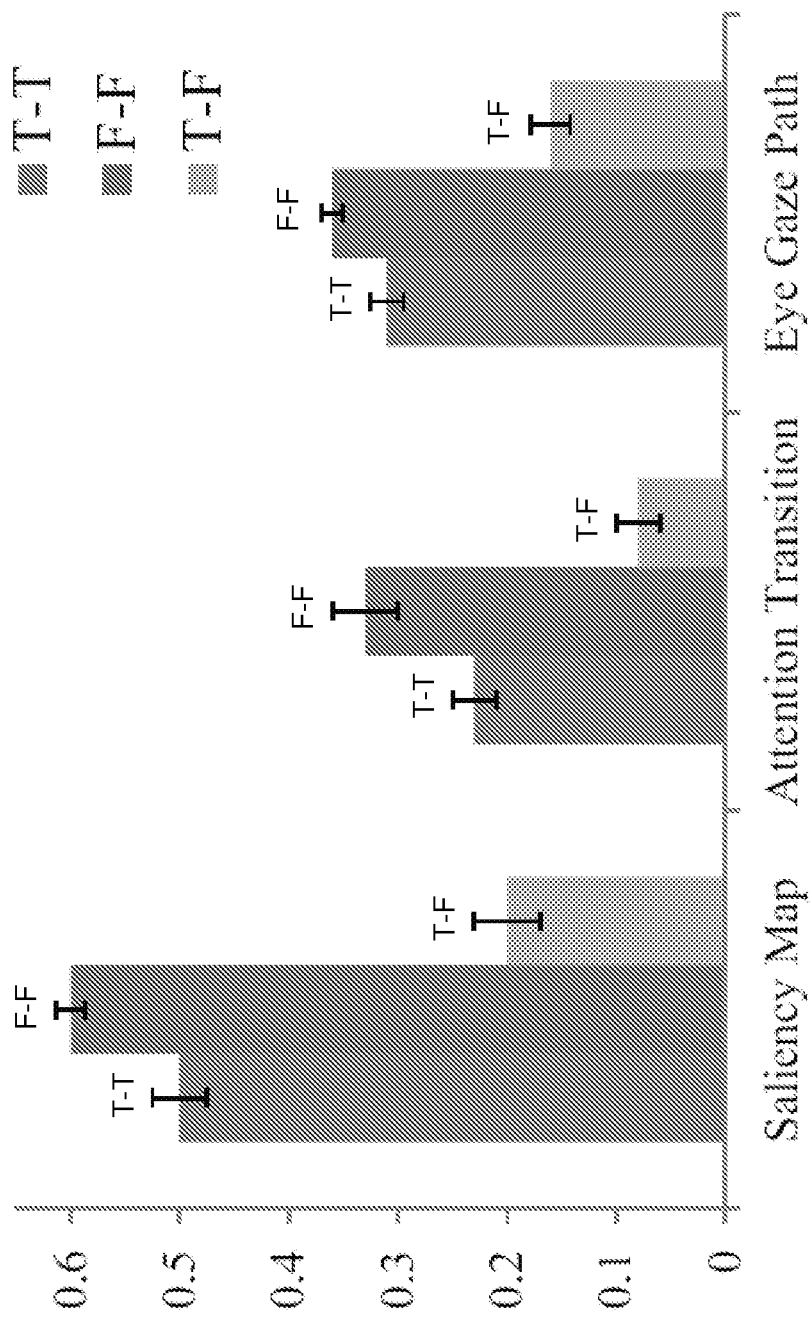
FIG. 7 is a graph showing the correlation of eye gaze behaviours of different users under task-driven condition (T) and free viewing condition (F) for saliency map, attention transition and eye gaze path.

With reference to FIG. 7, which shows correlation of eye gaze behaviours of different users under task-driven condition (T) and free-viewing condition (F) for three different measures, i.e., saliency map, attention transition and eye gaze path. For all the measures, the correlation values for T-T and F-F are uncharacteristically similar (paired t-test, p=0:52), while both T-T and F-F have significantly higher correlation values than T-F (paired t-test, p<0:05), this Figure thus shows the average correlation coefficients for the three eye gaze measures. For all three measures, the eye gaze data of users from different conditions (T-F) has lower correlation, as compared with those from the same condition (T-T and F-F). This suggests that user eye movements on web designs under task-driven condition are different from those under free-viewing condition. With a task in hand, users tend to directly gravitate to the components that are likely to be useful for completing their goals, rather than looking at all information as under free-viewing condition.

Due to the task-oriented nature of webpages, it is more useful to model user attention behaviours under task-driven condition. Therefore, a focus of the inventors' study was to use eye gaze data collected under task-driven condition so as to build task-driven user attention models. Thus for the description below, all eye gaze data refers to those from task-driven users, unless otherwise stated.

In this example embodiment, the inventors are mainly concerned with how to quantify user attention transition between components of a web design under task-driven condition. A naive solution is to use a visual saliency map of a web design to generate the eye gaze path. Given a saliency map, the eye gaze path can be approximated by successively picking the most salient parts. The inventors then seek to test whether this simple method is effective in estimating user attention transition between the components in the temporal domain. To this end, the eye gaze path predicted from a user saliency map was compared against the actual attention transition. In particular, for each user on each web design in our dataset, it was first build an attention transition graph $\mathcal{G}$ from the user's eye tracking data using the method introduced above. Then, a saliency map was constructed using the user's eye tracking data, which is then used to predict an eye gaze path P. Each path segment of P represents a predicted local attention transition, i.e., $c_i \rightarrow c_j$. The performance of the saliency-based method in predicting user attention transition is obtained by comparing the transitions on P and $\mathcal{G}$. The inventors in turn regarded a path segment on P as correctly predicting an attention transition if the path segment is included in $\mathcal{G}$. Over all users and web designs, the accuracy of attention transitions predicted from the saliency map is only 2.5%.

The very low accuracy rate suggests that the saliency-based method performs poorly in predicting user attention transition between page components over time. The intuitive explanation is that the number of fixations on a page component does not necessarily indicate when that component was looked at. This motivates the inventors to design a dedicated model for predicting user temporal attention behaviours.

In one example embodiment, the user behaviour model which may be used by the system for optimizing an interface may be constructed to capture the correlation between the properties of two page components and user attention movement between them. In this example embodiment, the user behaviour model may be implemented to include two independent user attention models. These include a user attention transition model and a user attention order model.

In one example embodiment, the user attention transition model can be devised by considering the following:

Let $c_s \rightarrow c_d$ be a pair of ordered page components, where $c_s$ and $c_d$ are source and destination components, respectively. Our model $f_t$ maps the features v of $c_s$ and $c_d$ to a probability p of user attention shifting from $c_s$ to $c_t$, i.e., $p=f_t(v)$. It is learned using the collected eye gaze data, described in above. For each web design, it is possible to enumerate all pairs of ordered components. For each component pair, a set of features $v_i$ and the corresponding user attention transition probability $p_i$ are extracted from the attention transition matrix T. From this point, it is possible to ignore pairs that start with a component whose corresponding row in T only has zeros. There will be no user attention transitions for such pairs, since users may never looked at the source components. Thus, they provide no useful information for learning our model. It is also possible to ignore pairs whose source components are visited by less than 10% of the users, since the computation of their attention transition probabilities based on only a few samples is not statistically reliable. After processing the data, that can be obtain will include a set of 12,000 training examples $D=\{(v_i, p_i)\}$.

When selecting features for example embodiments of the attention models, computational efficiency may be a main concern since the models are used in the cost function of our iterative optimization. Hence, the inventor's feature design may prefer simple and effective low-level features. The feature vector v for a pair of ordered components $c_s \rightarrow c_d$ comprises two types of features: pairwise features and context features. The pairwise features capture the spatial and appearance properties of $c_s$ and $c_d$ that may affect user attention transition, and contains the following:

Scale ratio—the ratio between areas of $c_s$ and $c_d$.

Normalized distance—the minimum Euclidean distance between the bounding boxes of $c_s$ and $c_d$, normalized with respect to the diagonal length of the web design. The distance is set to 0 if the two bounding boxes intersect.

Normalized position—the center of the bounding box of $c_s$ and $c_d$ relative to the center of the web design. It is normalized with respect to the dimensions of the web design.

Relative orientation—the angle between the vector from the center of $c_s$ to that of $c_d$ and the horizontal vector. It is mapped to [0°,360°] and then normalized to [0, 1].

Intensity difference—the difference between the average intensities of $c_s$ and $c_d$.

Color contrast—$X^2$ distance between the Lab color histograms of $c_s$ and $c_d$.

The context features capture how the other components in the neighborhood of $c_s$ and $c_d$ affect attention transition between $c_s$ and $c_d$. For example, if another component is closer to $c_s$ than $c_d$, users may move their eyes directly to this component rather than to $c_d$. The neighbors of $c_s$ can also be defined as any components (except $c_d$) whose normalized distances (with respect to the diagonal length of the web design) to $c_s$ are smaller than r. By inspecting our eye tracking data, the inventors had empirically found that the component pairs with normalized distances larger than 0.4 have almost zero attention transition probabilities. Thus, the inventors refer to r as the effective normalized distance and set it to 0.4 in our implementation. The context features include the following:

Normalized distance to the nearest neighbor—the normalized distance from $c_s$ to its nearest neighbor, calculated in a similar way as the pairwise feature. It is set to 1 if no nearest neighbors within r are found.

Relative orientation to the nearest neighbor—the relative orientation feature between $c_s$ and its nearest neighbor, calculated in the same way as the pairwise feature. It is set to 0 if no nearest neighbors within r are found.

Size ratio to the largest neighbor—the ratio between the area of $c_s$ and that of its largest neighbor. It is set to 1 if no nearest neighbors within r are found.

Brightness ratio to the brightest neighbor—the ratio between the luminance of $c_s$ and that of its brightest neighbor. It is set to 1 if no nearest neighbors within r are found.

To learn the model from the training data, it is possible, in one example, to use random forest regression with 30 trees, as it is fast in training and prediction.

TABLE 1

The effect of each individual feature on the performance of our attention models.

| | RMSE | | correlation-based metrics | | |
| --- | --- | --- | --- | --- | --- |
| | transition | order | RRS | POMR | FCMR |
| all features | 0.073 | 0.084 | 0.79 | 78% | 72% |
| w/o scale ratio | 0.088 | 0.089 | 0.72 | 74% | 70% |
| w/o normalized distance | 0.082 | 0.088 | 0.70 | 70% | 68% |
| w/o normalized position | 0.085 | 0.080 | 0.72 | 82% | 75% |
| w/o relative orientation | 0.081 | 0.088 | 0.73 | 75% | 69% |
| w/o intensity difference | 0.093 | 0.089 | 0.69 | 72% | 66% |
| w/o color contrast | 0.095 | 0.091 | 0.58 | 72% | 67% |
| w/o normalized distance to nearest neighbor | 0.082 | 0.088 | 0.57 | 69% | 65% |
| w/o relative orientation to nearest neighbor | 0.086 | 0.089 | 0.59 | 68% | 63% |
| w/o size ratio to its largest neighbor | 0.091 | 0.085 | 0.58 | 65% | 61% |
| w/o brightness ratio to its brightest neighbor | 0.084 | 0.087 | 0.61 | 66% | 63% |
| w/o context features | 0.160 | 0.175 | 0.51 | 58% | 56% |

Besides the attention transition probability, it may also be important to also be concerned with the attention order between two components, that is whether one component is visited before or after another. This aspect can be modelled by a user attention order model which in one example embodiment can be devised by considering the following:

An attention order model $f_o$ can be constructed, by receiving the input of features v of a pair of ordered components $c_s \rightarrow c_d$ and predicts the probability p of $c_s$ being visited before $c_d$, i.e., $p=f_o(v)$. The attention order model is adapted from the above attention transition model by changing the output of the model p to be the probability of one component being visited before another. Consequently, during the training phase, $p_i$ of each training example is computed from partial order matrix O described above, instead of attention transition matrix T. Furthermore, it is also possible to exclude the normalized position feature in the attention order model, since the model performed better without this feature, as shown in Table 1.

Figure 8:
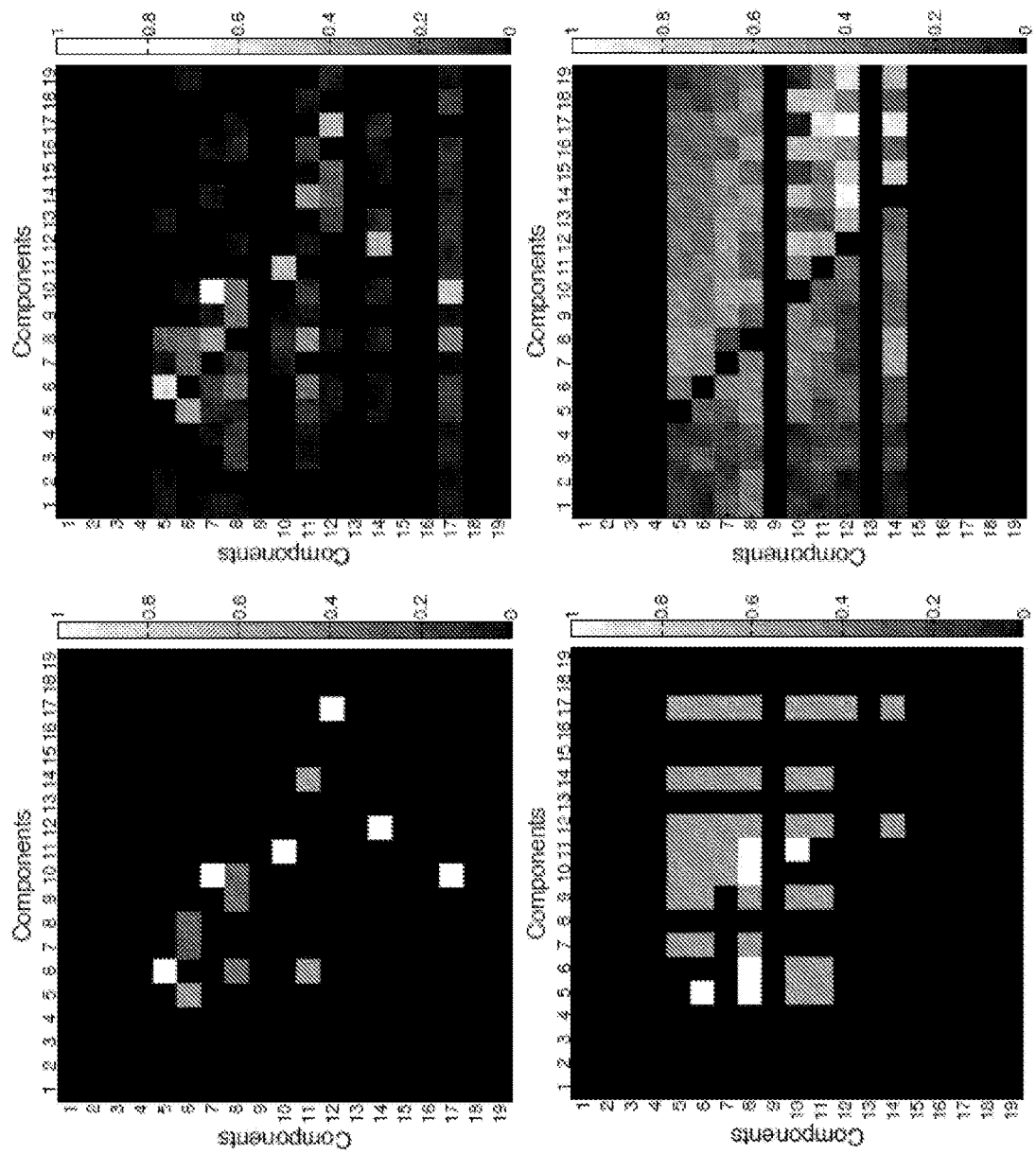
FIG. 8 are matrices showing the comparisons of the predictions of an example attention model.

Cross-validation on the training data was performed in one example to evaluate the accuracy of examples of the user attention models. In particular, the inventors had randomly split the training data D into 10 folds. For each fold, we train the models on 9 folds, and then calculate the root mean squared error (RMSE) of model predictions on the remaining fold. The average RMSE over all 10 splits provides an estimate of the generalization performance of the models. The inventors had found that by comparing the models with weaker models where one of the features is excluded. The results, as shown in Table 1, suggest that the models with all the features outperform other variants with one feature excluded. Furthermore, without the context features, the performance of the models dramatically decreases, which implies the importance of the context features. With reference to FIG. 8, there is shown comparisons of the predictions by the user attention models devised by the inventors (our models) with the ground truth. Top row: (left) ground truth and (right) predicted attention transition matrices. Bottom row: (left) ground-truth and (right) predicted attention order matrices.

In FIG. 8, the attention transition and attention order matrices predicted by our models are compared to the ground truth ones for the webpage in FIG. 8. Note that the web designs where predictions are made are not part of the training data.

The RMSE results reported above only measure the model accuracy for predicting each individual probability in the attention transition or attention order matrices. However, also of interest is how well the models can predict the relative ranking of components based on these matrices. For example, relative ranking is important in the design optimization process, where the attention models are used to encourage the most likely path to be consistent with the designer's intended path. To this end, the inventors further evaluate the models using three correlation-based metrics: row rank similarity (RRS), pairwise order matching rate (POMR), and first component matching rate (FCMR).

RRS may also be used to evaluate the attention transition model. Let $T_p$ and $T_g$ be the predicted and ground truth attention matrices for one web design. For the i-th row of $T_g$ that does not have all zero values, the inventors had first obtain a ranking $g_i$ for the components with non-zero probabilities. If multiple components have the same value, then it is possible to determine their order randomly. Next, for the corresponding row of $T_p$, the inventors then obtained a rank $p_i$ by sorting the components in $g_i$ based on their corresponding values in $T_p$. Finally, RRS is computed as Spearman's rank correlation coefficient between $g_i$ and $p_i$, which is normalized into the range [0, 1].

POMR and FCMR are used to evaluate the attention order model. To compute POMR, given a ground-truth attention order matrix $O_g$, it can be first determined that the visiting order between each pair of components denoted as (i,j), by calculating $\delta_{i,j}^g = O_g(i,j) - O_g(j,i)$. Component i is considered to be visited before component j if $\delta_{i,j}^g > 0$, and vice versa. Then, POMR is defined as the percentage of component pairs whose visiting orders are correctly predicted by our attention order model. In turn, it is possible to exclude the component pairs whose $\delta_{i,j}^g = 0$ since it is impossible to determine their visiting orders. FCMR measures the accuracy in predicting the first component that users will fixate on a web design. Given a web design, the first-fixated component is found by computing the order probability h from the attention order matrix O as described in above, and identifying the component with the largest probability. FCMR is then defined as the percentage of web designs whose first visiting components are correctly predicted by our attention order model.

A cross-validation as above is then performed to compute average RRS, POMR and FCMR, which are shown in Table 1. Note that without context features, the RRS values are dramatically reduced, suggesting that the context features play an important role in enabling our attention transition model to well capture the relative ordering of components of users' attention behaviors.

Given an existing web design as well as an input sequence of components $S = \{c_1, c_2, \ldots, c_k\}$ that indicates the expected reading path over the components, one of the implementation goals is to automatically adjust the web design, such that the actual user attention path matches with S. In this regard, it can be represented that each web design as a union of a set of page components. By parameterizing the i-th component using its center position $(x_i, y_i)$, size (width $w_i$ and height $h_i$), and colour $r_i$. A web design can be represented as $C = \{(x_i, y_i, w_i, h_i, r_i)\}$. It follows that the inventors can formulate the design adjustment as an optimization problem, where the inventors had minimize an objective function comprising three terms: attention, prior, and regularization, i.e., $E(C) = \alpha_1 E_{att}(C) + \alpha_2 E_{prior}(C) + \alpha_3 E_{reg}(C)$.

In one example, the inventors' implementation uses $\alpha_1 = 0.5$, $\alpha_2 = 0.3$, $\alpha_3 = 0.2$. The inventors then optimize over the components corresponding to the leaf nodes in the visual hierarchy tree, and do not alter the components whose properties cannot be changed, e.g., an object that is part of a large background image (component 8 in FIG. 3). In this section, it is first introduced the formulation of each term in details, and then described how to optimize our objective function.

The attention term $E_{att}$ is used to encourage the actual reading path over a sequence of selected components S to match the path intended by the designer. In other words, it prefers the web design configuration where users will follow the reading path defined by S, by successively looking at the components in S. The attention term is defined as $E_{att} = E_{att}^O + E_{att}^T$, where $E_{att}^O$ and $E_{att}^T$ are the order term and transition term, respectively.

The order term $E_{att}^O$ constrains each component in S to be read before all its successors $S_i = \{c_j | j > i, c_j \in S\}$, and is defined as:

$$E_{att}^O = -\frac{1}{|S|-1} \sum_{c^i \in S} \frac{1}{|S_i|} \sum_{s \in S_i} [p_o(c^i \to s) - p_o(s \to c_i)] \quad (1)$$

where $p_o(s \to c_i)$ is the probability of s being visited before $c_i$ as predicted by our attention order model. $E_{att}^O$ favours the user attention from $c_i$ to all its successors and penalizes the user attention movement in the opposite direction. However, this term alone does not suffice to satisfy all requirements since it only enforces the components in S to be read in a given order, but not necessarily in successive manner. For example, after viewing $c_i$, users may move their eyes to other components that are not included in S before looking at $c_{i+1}$.

The transition term $E_{att}^T$ is introduced to ensure that user attention successively transitions across the components in S. Since user attention transition is less likely to occur between two components whose distance is larger than the effective normalized distance, as described above. Thus, when computing the transition term, for each component $c_j$, the inventors had only consider its neighbours $N_i$ within the effective normalized distance. $E_{att}^T$ is:

$$E_{att}^O = -\frac{1}{|s|-1} \sum_{c_i \in S \setminus c_k} \left[ p_t(c_i \rightarrow c_i + 1) - \max_{c \in N_i \setminus c_j} p_t(c_i \rightarrow e) \right] \quad (2)$$

where $c_k$ is the last component in S and $p_t(c_i \rightarrow c_j)$ is the probability of user attention transition from $c_i$ to $c_j$ by this example of the attention transition model. This term may encourage user attention transition from one component $c_t \in S$ to its immediate successor, while suppressing the transition from $c_i$ to other neighboring components.

In some example scenarios, designers may want a certain component on the input path to be the first (or starting) component that users will look at on the page. It is possible to support this design intent by adding an extra term $E_{att}^O$ to the attention term defined above. In particular, let $h=\{h_i\}$ be the order probability calculated from the partial order matrix predicted by the attention order model, where $h_i$ is the probability of the i-th component being visited before all other components. It follows that by defining the first-fixation term as:

$$E_{att}^F = -\left( h_{c_1} - \max_{s \in \Omega \setminus c_i} h_s \right) \quad (3)$$

where $c_1$ is the first component on the input path and $\Omega$ is the set of all components on the input design.

An effective web design should closely adhere to several visual design principles, such as alignment and symmetry. To account for these design principles, the inventors introduced a prior term that measures how well a given design conforms to the most widely used graphic design guidelines. The prior term consists of the energy terms for alignment $E_a$, balance $E_b$, white space $E_w$ and overlap $E_o$ that are implemented to model single-page graphic designs. Moreover, since the inventors had modify the colours of page components during the optimization, a colour term $E_c$ to enforce colour compatibility of the optimized web design can be further introduced. The inventors then define $E_c = 1 - \alpha/s$, where $s \in [0, 5]$ is the score returned by the colour compatibility model learned from a large dataset of colour themes. Finally, the prior term is formulated as $E_{prior} = w_1 E_a + w_2 E_b + w_3 E_w + w_4 E_o + w_5 E_o$. In this example implementation, the inventors had used $w_1 = w_2 = w_3 = w_4 = w_5 = 0.2$.

The regularization term is used to prevent the optimized web design from deviating too much from its original configuration, and is defined as $E_{reg} = \|C\ C_0\|^2$, where $C_0$ is the configuration of the input web design.

Since one of the objective functions is highly multimodal, Markov chain Monte Carlo sampling techniques may be used to efficiently explore its solution space. In particular, Metropolis-Hastings algorithm was used to iteratively sample the design until a maximum number of iterations (i.e., 1000) is reached or the change in E(C) between two consecutive iterations is smaller than 0.001. At each iteration, we maintain a page configuration C, and generate a new configuration C' by randomly drawing among several proposal moves:

Update component position—perturb the position of a random component by adding Gaussian noise.

Update component size—perturb the size of a random component by scaling it with Gaussian noise.

Update text color: replace the text color of a random component with a random color from a page-specific color palette. In this example, the color palette is constructed by applying K-means clustering to extract 10 representative colors in Lab space from the input web design. To make sure that the text is visible, the inventors exclude colors that are similar to the average color of the text's neighborhood. Furthermore, to guarantee visual coherence, the inventors force the text components belonging to the same group (i.e., the nodes sharing the same parent in the visual hierarchy tree) to take the same color, unless the selected text component is on the input path.

Update button color: replace the color of a random button component with a random color selected from the design-specific color palette.

Align components: using a random component as an anchor, randomly select an alignment type (e.g., left alignment), and move the other components that are near to the anchor (e.g., in terms of left boundary distance) to align with the anchor.

To maintain the visual structure of the input design, the child-parent and sibling relations were identified among the components using the extracted visual hierarchy tree, and neglect invalid moves based on these relations. In particular, it is possible to ignore the moves that result in a component falling outside the boundaries of the input web design or its parent container. Moreover, the inventors had also discard the moves that make the sibling components (i.e., the nodes belonging to the same parent node in the visual hierarchy tree) overlap.

In one example implementation of the invention, a variety of web designs were processed by the system so as to evaluate quantitatively the effectiveness of the system in optimizing an interface such as a computer graphical interface.

Figure 9:
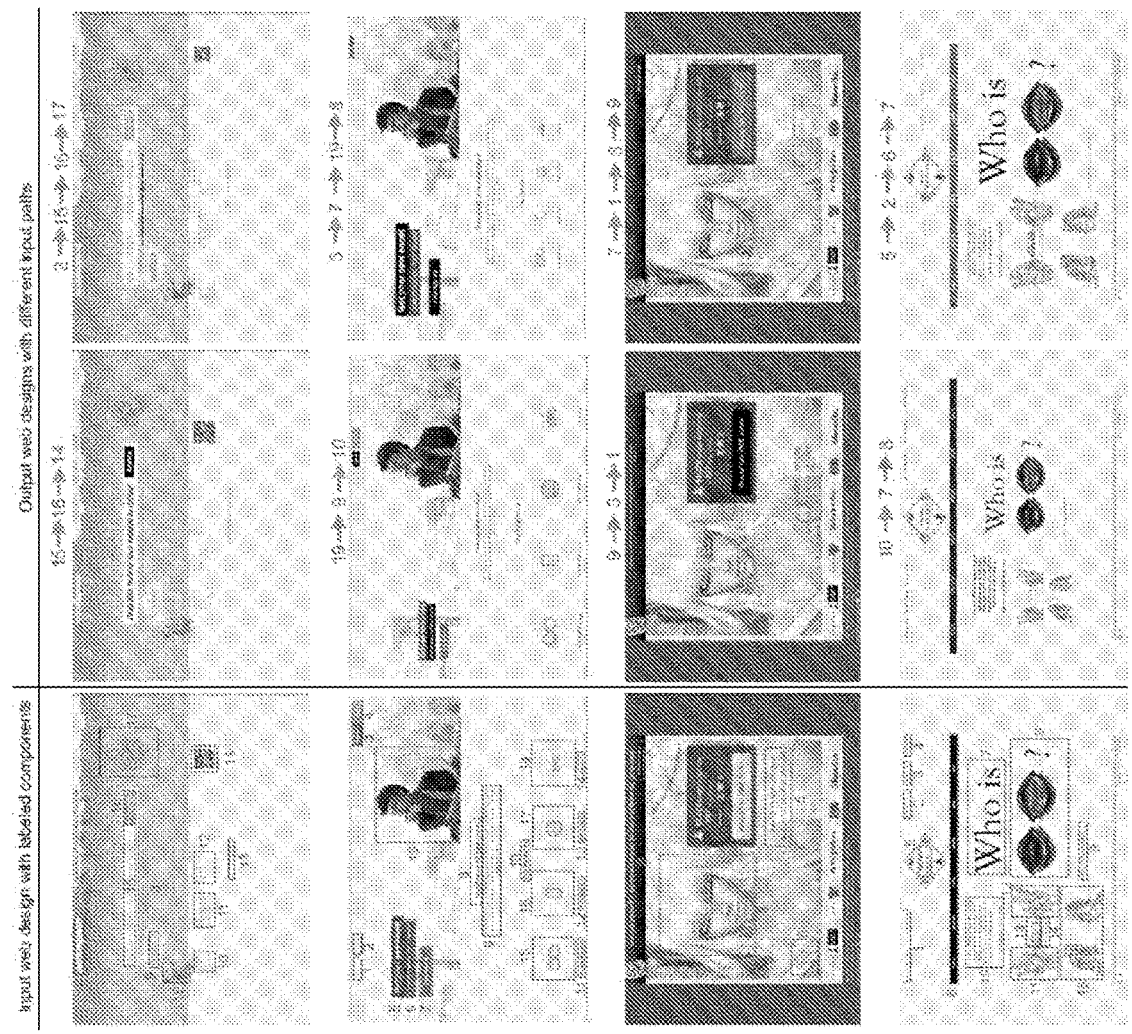
FIG. 9 are example screenshots of a website undergoing optimization in accordance with one example embodiment of the system for optimizing an interface of FIG. 2.

In order to perform this analysis, a test was performed on web designs of different genres. For each web design, the inventors had specified different intended eye gaze paths, each of which results in a different optimized page. With reference to FIG. 9, there is shown examples of web designs generated by an example method (our method) for optimizing an interface from four input web designs. For each of the input designs (first column), two optimized web designs (second and third columns) are generated using two different input paths shown on top of the optimized designs.

As shown in FIG. 9, four example web designs along with their respective optimized versions. Note that directing user attention along a specified path entails complex and subtle changes to the input web design. For example, consider the rightmost result of the first row of FIG. 9. To increase the probability of the user's gaze transiting from component 2 (the logo) to component 15 (the input field), component 3 and its siblings (the group of text links at the top of the page) are pushed away from component 2. In addition, the color of component 16 (the button) is set to be the same as that of component 17 (the robot), so that the user can perceptually group them together and naturally transit from components 16 to 17. Further, component 14 (the QR code) is made smaller and moved away from component 16, reducing the probability of transiting from components 16 to 14.

To perform further quantitative evaluation, it is possible to next perform an eye-tracking experiment to evaluate how well the method to optimize an interface aids designers in controlling viewer attention behaviors on web designs. In a particular example, the inventors collected eye gaze data from users on the optimized web designs generated by the method, and measure the consistency between the designer specified eye gaze path and actual users' eye gaze paths. For this one example purpose, the inventors used 9 web designs of different types and with varying level of composition complexity. For each web design, the inventors specify three different eye gaze paths with lengths {3, 4, 5}, and apply our method to generate three novel web designs based on each of the input paths. In addition, to assess the functionality of our method in permitting designers to specify the first-fixate component, for each testing web design, the inventors select one of its input paths at random and run the optimization with term $E_{att}^F$ enabled. In total, the inventors generated 36 optimized web designs (9 pages×4 specified input paths per page). Refer to FIG. 9 for some example results.

The inventors then performed an example eye-tracking study to record the eye movements of different users on the optimized pages. The study involves 40 participants, all of which were recruited from a public participant pool and had no knowledge about the purpose of the study in advance. The web designs were viewed under the task-driven condition. As described above, the inventors presented an instruction page describing the task, followed by the web design. In the example experiment, each participant was asked to view 9 web designs, each of which was a randomly selected, optimized version of a different input page. Each optimized page was viewed by 10 different participants.

For each participant, the inventors then computed the actual reading path across all the components of a web design based on the eye gaze data, and compared it to the input reading path. More specifically, for each optimized web design, the inventors calculated the percentage of actual viewers whose eye gaze paths over the components in the input path exactly match the input path, and referred to it as matching rate. Higher matching rate indicates better ability to direct user attention. For comparison purpose, the inventors also calculated the matching rate of the original input web designs, using eye tracking data from 10 different users FIG. 10 (left), which shows average matching rates for eye gaze paths on web designs generated by an example method for optimizing an interface (our method), compared with their respective input web designs. The optimized web designs achieve significantly higher matching rates, as compared with the input web designs (independent t-test, p<0.001). This implies that the example embodiment of the method for optimizing an interface, is effective in improving the input web designs to direct user attention behaviours in a way specified by the input paths.

Figure 10:
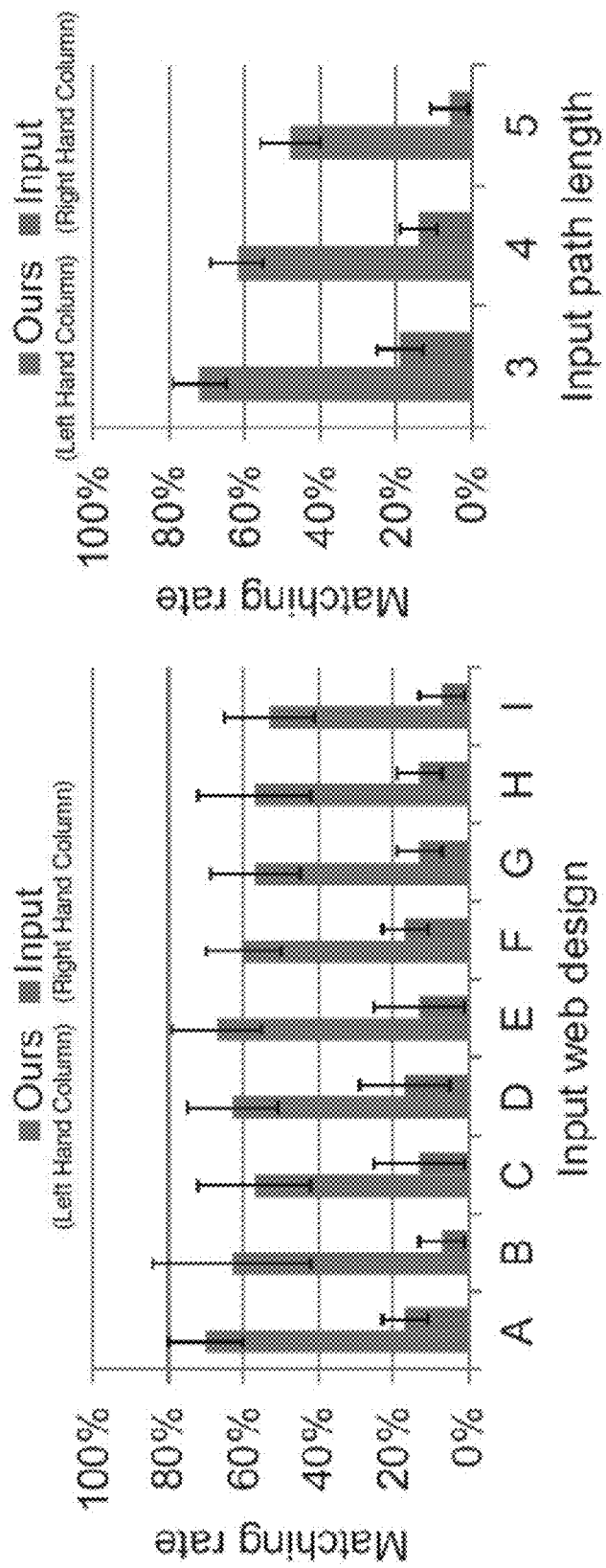
FIG. 10 are graphs which illustrate average matching rates for eye gaze paths on web designs generated by our method, compared with their respective input web designs and average matching rates versus input path length.

The inventors further investigated the impact of the length of input path upon the performance of our method, by analysing how the matching rate changes when the length of input path increases from 3 to 5. To this end, we group the optimized web designs based on the length of input path, and computed the average matching rate of each group. The results are shown in FIG. 10 (right), which shows average matching rates versus input path length. The ability of the example method for optimizing an interface (our method) in directing user attention decreases as the length of input path increases (Pearson's correlation coefficient between matching rate and input path length is −0.98).

Finally, the inventors evaluated the effect of the first-fixation term $E_{att}^F$ by performing an A/B test where the inventors had compared pairs of output web designs that are optimized using the same input path with and without $E_{att}^F$.

With $E_{att}^F$ enabled, the first component on an input path should be visited as early as possible. Therefore, the evaluation is based on the time spent by users on a web design before visiting the specified first component. With $E_{att}^F$, it takes on average 0.9±0.3 seconds for the users to look at the first component of an input path, while it takes on average 1.5±0.6 seconds without $E_{att}^F$. Although including $E_{att}^F$ does reduce the time that the users take to visit the first component of an input path, we find that the reduction is only marginally significant (independent t-test, p=0.08). This is perhaps because in one example, the optimizer, even without $E_{att}^F$, would encourage the starting component of an input path to be visited before the remaining components of the path, thus already making the starting component more likely to be viewed first by chance.

Figure 11:
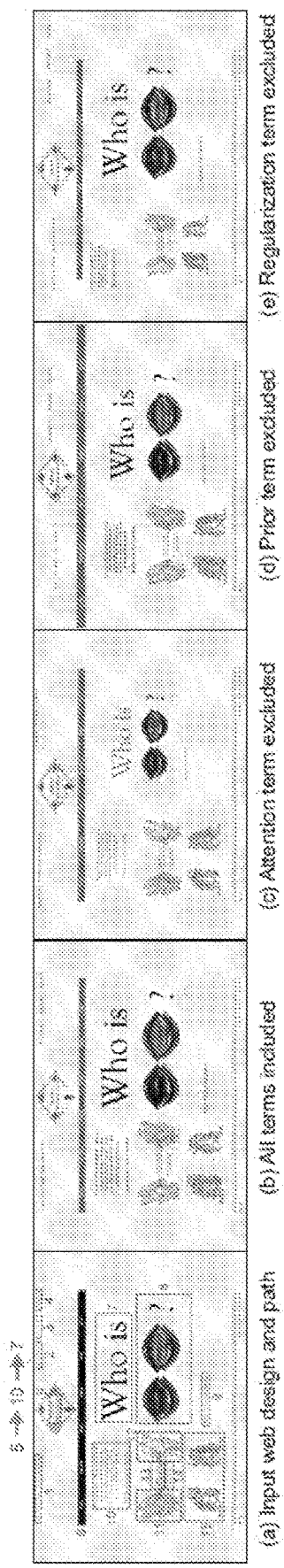
FIG. 11 are screenshots showing the effect of each energy term on the optimized result.

The inventors had also tested the effect of each energy term in one example optimization by generating a web design with each term omitted in turn. As shown in FIG. 11, each term contributes to the final result. FIG. 11 shows the effect of each energy term on the optimized result. With the attention term excluded (c), the resulting design fails to guide user attention along the input path. In this case, the optimizer shrinks both components 10 and 7, and increases the perceptual distance between them. Hence, there is now a higher chance that user attention will move from components 10 to 11 or 12, which is both larger and closer to component 10. With the prior term excluded (d), some visual design principles, e.g., alignment and balance, are violated. With the regularization term excluded (e), the layout style of the input design changes significantly.

At least one embodiment of the present invention, it was possible to provide a function to empower web designers with an ability to control users' viewing behaviors on webpages in an intuitive way. To this end, the inventors have gathered and analyzed eye-tracking data from real-world users on webpages of various types, and proposed novel task-driven visual attention models, which predict user attention transition and order between page components from their low-level properties. Given an input web design and an intended reading path over a set of components, the input page is automatically adjusted via an optimization to match the intended and actual user attention behaviours. Examples of these methods may also be integrated into commercial web design editors, aiding designers in creating more effective web designs.

In some example embodiments, it is possible that certain examples may not be optimal in providing excellent results for some extreme input paths. This is because in order to preserve the original layout style of the input web design as much as possible, examples of some optimizers penalize major modifications to the input page (e.g., swapping the positions of two components), which are sometimes required in order to match an input path well. For example, as shown in FIG. 12, if an input path starts with a component near the bottom of a page and then points towards a component at the top of the page, it will be difficult to generate a reasonable result without significantly changing the positions or sizes of the relevant components. To address this issue, it is possible to consider exposing the weights of the regularization terms to web designers, so that they will have the freedom to control the trade off between preserving their original layout and matching their specified input paths.

By allowing user attention behaviors to be controlled at the component level and by exploiting the visual hierarchy of a webpage, it is possible to enable designers to manipulate users' attention behaviors at different levels of details. For example, designers may want to direct user attention at the group level, by drawing a path over disjoint groups of the components. To this end, it is possible to group the components of a web design based on its hierarchical structure, and model the attention behaviors across the component groups using component level attention models. Second, it is also possible to treat the webpage as a static entity whose contents do not change over time. Finally, the present embodiments may be advantageous in that it can be arranged to operate with potential applications of other visual attention models for helping the design process of webpages or any other interfaces. For example, rather than modifying an existing web design as described in some examples above, it would be possible to automatically re-target a web design across different form factors while still preserving its effectiveness in guiding user attention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for optimizing a user interface comprising the steps of:
building a user behaviour model including a user attention transition model and a user attention order model based on user behaviours, including eye gaze paths, collected from different users when viewing web designs presenting with a plurality of semantical elements arranged on each of a collection of webpages in a set of training examples, the user attention transition model being based on the portions of the web design being viewed by the different users, and the user attention order model being based on the timing at which the different users view the portions of the web design; and, when designing a new web page including the user interface:
segmenting the user interface of the new webpage into a plurality of interface components each having one or more component characteristics;
applying the user behaviour model to the one or more component characteristics of each of the plurality of interface components to determine one or more user interaction paths associated with how the users' visual attention moves on the new webpage when presented with the plurality of interface components; and
processing the one or more user interaction paths to optimize the plurality of interface components of the user interface; and
modifying the user interface by adjusting the plurality of interface components on the new webpage based on the one or more user interaction paths predicted by the user behaviour model and an intended eye gaze path associated with the plurality of interface components being specified by a designer of the new webpage; wherein the user behaviour model is arranged to model the user's spatial interaction with the plurality of interface components, and to model the user's temporal interaction with the plurality of interface components, including how the users' visual attention moves between each pair of interface component on the new webpage; wherein the user attention transition model is arranged to predict the user's attention transition between the plurality of interface components based on a likelihood of the user's attention moving from one of the interface components to another in a pairwise manner; and wherein a user attention order model is arranged to predict the user's attention order, in time, between the plurality of interface components based on a likelihood of each of the interface components being visited before another in a pairwise manner.

2. A method for optimizing a user interface in accordance with claim 1, wherein the step of processing the one or more user interaction paths to optimize the plurality of interface components of the user interface includes a step of determining one or more optimized interaction paths of the user interface.

3. A method for optimizing a user interface in accordance with claim 2, wherein the one or more optimized interaction paths of the user interface are determined by adjusting the one or more component characteristics and applying the user behaviour model to the adjusted one or more component characteristics.

4. A method for optimizing a user interface in accordance with claim 3, wherein the step of adjusting the one or more component characteristics generates a set of optimal component characteristics associated with the one or more optimized interaction paths.

5. A method for optimizing a user interface in accordance with claim 1, wherein the user attention transition model includes one or more correlations between the user's attention transition between the plurality of the interface components and the one or more component characteristics of the plurality of interface components.

6. A method for optimizing a user interface in accordance with claim 5, wherein the user attention order model includes one or more correlations between the user's attention order between the plurality of the interface components and the one or more component characteristics of the plurality of interface components.

7. A method for optimizing a user interface in accordance with claim 6, wherein the plurality of interface components includes user interactive objects, display objects, text, graphics or any combination of one or more thereof.

8. A method for optimizing a user interface in accordance with claim 7, wherein the one or more component characteristics of the plurality of interface components include pairwise characteristics of any two interface components.

9. A method for optimizing a user interface in accordance with claim 8, wherein the pairwise characteristics include: scale ratio, normalized distance, normalized position, relative orientation, intensity difference, color contrast or any one or more thereof between the any two interface components.

10. A method for optimizing a user interface in accordance with claim 6, wherein the one or more component characteristics of the plurality of interface components include context characteristics of any interface components relative to their adjacent interface components.

11. A method for optimizing a user interface in accordance with claim 10, wherein the context characteristics include: normalized distance to the nearest neighbor, relative orientation to the nearest neighbor, size ratio to the largest neighbor, brightness ratio to the brightest neighbour or any one or more thereof between the any interface component and its adjacent interface components.

12. A method for optimizing a user interface in accordance with claim 1, wherein the user behaviour model is arranged to model the user's interaction with the interface based on a relationship between the user's interaction and one or more characteristics of the plurality of interface components.

13. A method for optimizing a user interface in accordance with claim 12, wherein the one or more interface components of the interface are adjusted to match those of a set of optimal characteristics associated with the plurality of interface components, the set of optimal characteristics being generated by one or more preferred user interaction paths.

14. A system for optimizing a user interface comprising:
   a user behaviour model including a user attention transition model and a user attention order model both being built based on user behaviours, including eye gaze paths, collected from different users when viewing web designs presenting with a plurality of semantical elements arranged on each of a collection of webpages in a set of training examples, the user attention transition model being based on the portions of the web design being viewed by the different users, and the user attention order model being based on the timing at which the different users view the portions of the web design, the user behaviour model being arranged to cooperate with the following components when designing a new web page including the user interface;
   a segmenting module arranged to segment the user interface of the new webpage into a plurality of interface components each having one or more component characteristics;
   an interaction modelling engine arranged to apply the user behaviour model to the one or more component characteristics of each of the plurality of interface components to determine one or more user interaction paths associated with how the users' visual attention moves on the new webpage when presented with the plurality of interface components; and
   an optimization processor arranged to process the one or more user interaction paths to optimize the plurality of interface components of the user interface, and to modify the user interface by adjusting the plurality of interface components on the new webpage based on the one or more user interaction paths predicted by the user behaviour model and an intended eye gaze path associated with the plurality of interface components being specified by a designer of the new webpage; wherein the user behaviour model is arranged to model the user's spatial interaction with the plurality of interface components, and to model the user's temporal interaction with the plurality of interface components, including how the users' visual attention moves between each pair of interface components on the new webpage; wherein the user attention transition model is arranged to predict the user's attention transition between the plurality of interface components based on a likelihood of the user's attention moving from one of the interface components to another in a pairwise manner; and wherein the user attention order model is arranged to predict the user's attention order, in time, between the plurality of interface components based on a likelihood of each of the interface components being visited before another in a pairwise manner.

15. A system for optimizing a user interface in accordance with claim 14, wherein the optimization processor determines one or more optimized interaction path of the user interface.

16. A system for optimizing a user interface in accordance with claim 15, wherein the one or more optimized interaction paths of the user interface is determined by adjusting the one or more component characteristics and applying the user behaviour model to the adjusted one or more component characteristics.

17. A system for optimizing a user interface in accordance with claim 16, wherein the optimization processor generates a set of optimal component characteristics associated with the one or more optimized interaction paths.

18. A system for optimizing a user interface in accordance with claim 14, wherein the user attention transition model includes one or more correlations between the user's attention transition between the plurality of the interface components and the one or more component characteristics of the plurality of interface components.

19. A system for optimizing a user interface in accordance with claim 18, wherein the user attention order model includes one or more correlations between the user's attention order between the plurality of the interface components and the one or more component characteristics of the plurality of interface components.

20. A system for optimizing a user interface in accordance with claim 19, wherein the plurality of interface components includes user interactive objects, display objects, text, graphics or any combination of one or more thereof.

21. A system for optimizing a user interface in accordance with claim 20, wherein the one or more component characteristics of the plurality of interface components include pairwise characteristics of any two interface components.

22. A system for optimizing a user interface in accordance with claim 21, wherein the pairwise characteristics include: scale ratio, normalized distance, normalized position, relative orientation, intensity difference, color contrast or any one or more thereof between the any two interface components.

23. A system for optimizing a user interface in accordance with claim 19, wherein the one or more component characteristics of the plurality of interface components include context characteristics of any interface components relative to their adjacent interface components.

24. A system for optimizing a user interface in accordance with claim 23, wherein the context characteristics include: normalized distance to the nearest neighbor, relative orientation to the nearest neighbor, size ratio to the largest neighbor, brightness ratio to the brightest neighbor or any one or more thereof between the any interface component and its adjacent interface components.

* * * * *